United States Patent
Hale et al.

(10) Patent No.: US 9,600,155 B2
(45) Date of Patent: Mar. 21, 2017

(54) COMPUTER IMPLEMENTED METHODS AND APPARATUS FOR CUSTOMIZING A DATA INTERFACE IN AN ON-DEMAND SERVICE ENVIRONMENT

(71) Applicant: salesforce.com, inc., San Francisco, CA (US)

(72) Inventors: Shannon Hale, San Francisco, CA (US); Cameron Reynolds-Flatt, San Francisco, CA (US); Adam James Putinski, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 239 days.

(21) Appl. No.: 14/327,416

(22) Filed: Jul. 9, 2014

(65) Prior Publication Data

US 2015/0020010 A1    Jan. 15, 2015

Related U.S. Application Data

(60) Provisional application No. 61/846,318, filed on Jul. 15, 2013.

(51) Int. Cl.
*G06F 3/0484*   (2013.01)
*G06F 9/44*    (2006.01)
*G06F 9/445*   (2006.01)

(52) U.S. Cl.
CPC ........ *G06F 3/04842* (2013.01); *G06F 9/4443* (2013.01); *G06F 8/65* (2013.01)

(58) Field of Classification Search
CPC .................................................. G06F 3/04842

(Continued)

(56) References Cited

U.S. PATENT DOCUMENTS 5,577,188 A    11/1996 Zhu
5,608,872 A    3/1997 Schwartz et al.
(Continued)

FOREIGN PATENT DOCUMENTS

WO  PCT/US2014/029355    3/2014

OTHER PUBLICATIONS

U.S. Appl. No. 13/943,657, filed Jul. 16, 2013, Beechuk et al.
(Continued)

*Primary Examiner* — Reza Nabi
(74) *Attorney, Agent, or Firm* — Weaver Austin Villeneuve & Sampson LLP

(57) ABSTRACT

Disclosed are methods, apparatus, systems, and computer program products for customizing a data interface in an on-demand service environment. In some implementations, a computing device provides an application for customizing a data interface displayable on a plurality of display devices having different form factors, the application providing one or more configurable templates. The computing device receives a selection of a template and provides for display a configuration interface of the application displaying one or more components arranged according to the selected template. The computing device receives a request to display a preview of the data interface at a display dimension corresponding to a display device, the display device having a form factor. The computing device determines, based on the requested display dimension, a display configuration for the components of the data interface and provides for display in the configuration interface the components according to the determined display configuration.

20 Claims, 18 Drawing Sheets

(58) Field of Classification Search
USPC .......................................................... 715/765
See application file for complete search history.

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,761,810 B2 * | 7/2010 | Shim .................. G06F 3/04886 715/810 |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,255,828 B2 * | 8/2012 | Harris .................. G06F 3/0481 715/711 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,812,951 B1 * | 8/2014 | White .................. G06F 17/211 715/200 |
| 8,965,306 B1 * | 2/2015 | Reeves .................. H04W 88/06 455/90.3 |
| 9,262,548 B2 * | 2/2016 | Zechlin ............ G06F 17/30905 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |

(56) References Cited

U.S. PATENT DOCUMENTS

| | | |
|---|---|---|
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0085741 A1* | 4/2006 | Weiner ............... G06F 17/30893 715/246 |
| 2007/0214002 A1* | 9/2007 | Smith ................... G06F 19/328 705/2 |
| 2008/0103854 A1* | 5/2008 | Adam ................. G06F 21/6218 705/344 |
| 2008/0244424 A1* | 10/2008 | Fukuda ..................... G06F 8/34 715/763 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0077321 A1* | 3/2010 | Shen ................. G06F 17/30905 715/760 |
| 2010/0165201 A1* | 7/2010 | Yim ................... H04N 5/44591 348/565 |
| 2010/0199197 A1* | 8/2010 | Faletski |
| 2011/0122155 A1* | 5/2011 | Zechlin ............. G06F 17/30905 345/660 |
| 2011/0202606 A1* | 8/2011 | Agarwal ............. H04L 12/1859 709/206 |
| 2011/0218958 A1 | 9/2011 | Warshavsky et al. |
| 2011/0238646 A1* | 9/2011 | Chamberlain .... G06F 17/30864 707/706 |
| 2011/0247051 A1 | 10/2011 | Bulumulla et al. |
| 2012/0042218 A1 | 2/2012 | Cinarkaya et al. |
| 2012/0060087 A1* | 3/2012 | Jame ................. G06F 17/30905 715/238 |
| 2012/0233137 A1 | 9/2012 | Jakobson et al. |
| 2012/0290407 A1 | 11/2012 | Hubbard et al. |
| 2013/0016127 A1* | 1/2013 | Takashima ............ G06F 3/0481 345/660 |
| 2013/0207771 A1* | 8/2013 | Ersavas .................. G05B 15/02 340/3.1 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0074572 A1* | 3/2014 | Bell ........................ G06Q 10/10 705/14.7 |
| 2014/0074922 A1* | 3/2014 | Bell ........................ G06Q 50/01 709/204 |
| 2014/0096046 A1* | 4/2014 | Zhong ............... G06F 17/30867 715/765 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0020010 A1* | 1/2015 | Hale ..................... G06F 9/4443 715/765 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0378685 A1* | 12/2015 | Kaplinger ............... H04L 67/02 717/104 |
| 2016/0342685 A1* | 11/2016 | Basu ................. G06F 17/30734 |

OTHER PUBLICATIONS

U.S. Appl. No. 13/943,629, filed Jul. 16, 2013, Beechuk et al.
U.S. Appl. No. 13/943,636, filed Jul. 16, 2013, Beechuk et al.
U.S. Appl. No. 13/943,640, filed Jul. 16, 2013, Beechuk et al.
"Google Plus Users", Google+Ripples, Oct. 31, 2011 [retrieved on Feb. 21, 2012 from Internet at http://www.googleplusers.com/google-ripples.html], 3 pages.
Gaul, et al. "Supporting Mobile Devices with Microsoft Content Management Server 2002," *Microsoft* 2003.
"Responsive layout templates," *IBM Knowledge Center* 2016.

* cited by examiner

COMPUTER IMPLEMENTED METHODS AND APPARATUS FOR CUSTOMIZING A DATA INTERFACE IN AN ON-DEMAND SERVICE ENVIRONMENT

PRIORITY DATA

This application claims priority to commonly assigned U.S. Provisional Patent Application No. 61/846,318, filed on Jul. 15, 2013, entitled DECLARATIVE APPLICATION BUILDER, by Hale et al., which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to on-demand services provided over a data network such as the Internet, and more specifically to a console application for customizing a data interface in an on-demand service environment.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process steps for the disclosed inventive systems and methods. These drawings in no way limit any changes in form and detail that may be made to embodiments by one skilled in the art without departing from the spirit and scope of the disclosure.

DETAILED DESCRIPTION

Figure 1A:
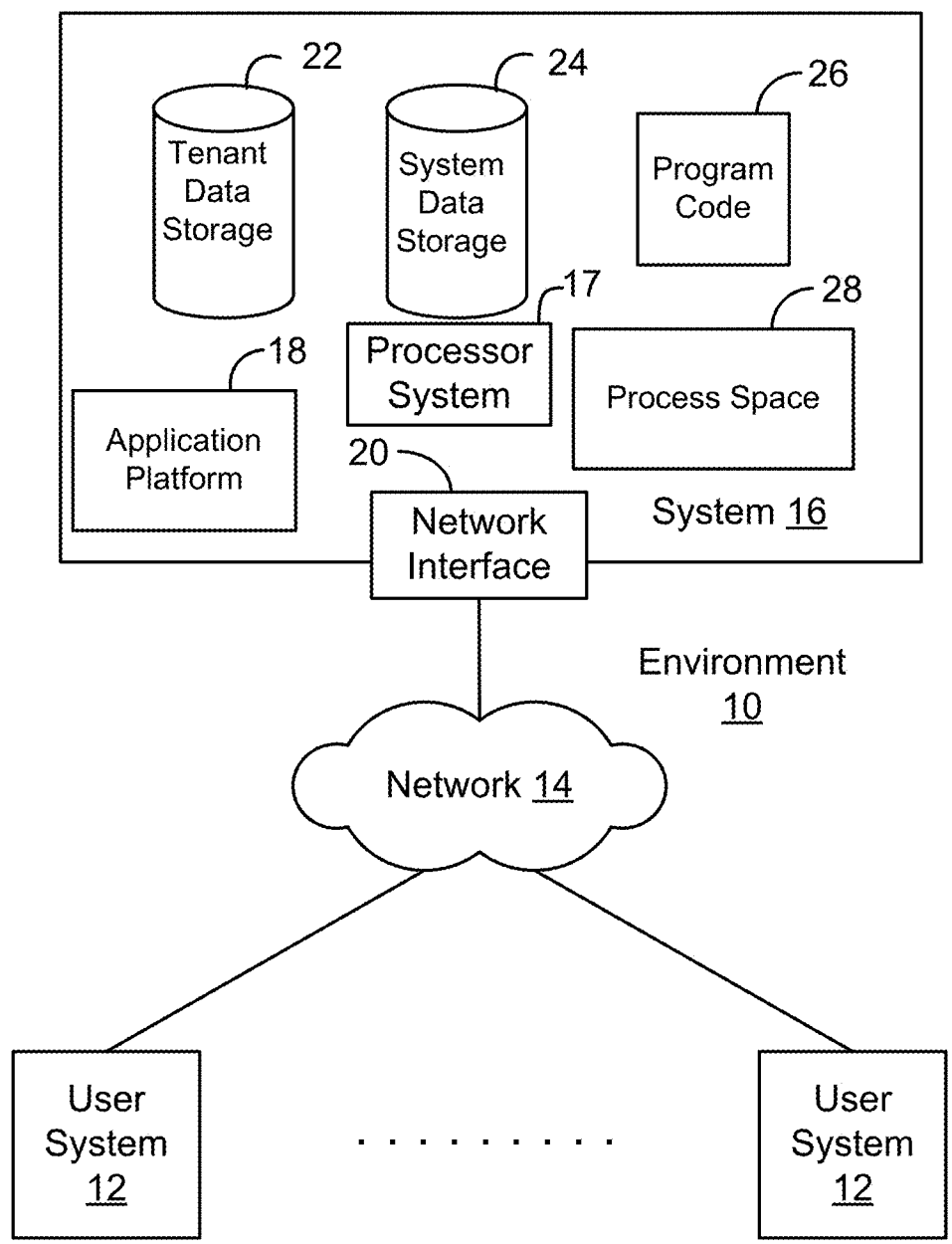
FIG. 1A shows a system diagram of an example of architectural components of an on-demand service environment, in accordance with some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Tools and techniques for providing a declarative application builder to users of an on-demand service environment are described herein. When building a new application for viewing or accessing information in an on-demand service environment, a user may utilize a page layout editor that enables him to drag and drop components to various portions of the screen. The end product results in an interface used to access database records and other information stored in the on-demand service environment, such as Customer Relationship Management (CRM) records in the form of sales leads, opportunities, accounts, and metrics about the same. However, existing tools and techniques for providing page layout editors rely on burdensome layout editors that result in users having to generate different layouts for different sized display screens, such as desktop monitors, tablet computers, and mobile phones. As a result, the same page may need to be designed for different layouts, creating duplicative work and wasted resources.

Various implementations described and referenced herein are directed to systems, apparatus, computer implemented methods and computer-readable storage media for building a dynamic web application for accessing information hosted on an on-demand service environment. In some implementations, the declarative application builder may provide one or more templates for users to select from when building a new page. Some of the templates may be custom-generated by third-party developers or partners or independent software vendors. The list of templates may include the most recently used templates or the most frequently used templates in the application. In some implementations, various template types may be provided, such as a "Social" type template, a "Portal" type template, an "Object" type template, or a "Records" type template. Additionally, each template may include a component arrangement scheme, such as a two column layout with a publisher feed in one column and a list of components in the other column.

In some implementations, once a template for the user interface has been selected, a user may add one or more components to the user interface for inclusion in the web application. As an example, a component may include Followers, Following, Groups, Tasks, and Analytics. A preview for the component may appear in real-time as the user selects a component from the menu. In some implementations, upon selection of the component, the user may also provide selectable and configurable properties for the newly-selected component.

In some implementations, the user interface may provide a real-time preview of the web application at various display widths corresponding to display devices having different form factors. As an example, one display width may correspond to a smartphone display form factor. As another example, a second display width may correspond to a tablet display form factor. A slider bar may be provided to allow a user to select a particular display width, causing the components of the user interface to automatically shrink or enlarge or be rearranged on the user interface accordingly. As an example, if a user drags the slider bar from a larger display width to a smaller display width, a task list component may be automatically shrunken by shrinking the font of the text or by removing one or more tasks from the task list component in order to fit the smaller display width. Similarly, a social feed component may be automatically shrunken to accommodate the newly selected display width size.

As another example, a set of components may be arranged in two columns at a larger display width. When a smaller display width is designated, the components may be rearranged into a single column. In some implementations, components in the second column may be simply moved to the bottom of the single column. In other implementations, the order of the components may also be rearranged. The resizing and rearranging of the components may be done dynamically and shown in real-time in the user interface.

In some implementations, different components may be customized for mobile devices or desktop devices. When a form factor corresponding to a mobile device is selected, the preview may include the components that are customized for mobile devices. When a form factor corresponding to a desktop device is selected, the preview may hide the mobile components and display only the desktop relevant components.

In some implementations, a user designing a data interface for accessing information of the on-demand service environment can preview in real time how different components of the interface look and are arranged when viewed on display devices having different form factors.

The implementations described or referenced above and below as well as other implementations can be embodied in various types of hardware, software, firmware, or combinations thereof. For example, some techniques disclosed herein may be implemented, at least in part, by computer-readable media that include program instructions, state information, etc., for performing various services and operations described herein. Examples of program instructions include both machine- or processor-executable code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status (for example, text describing what the user is currently doing, thinking or expressing). As mentioned below, the data can include messages created by other users. Where there are multiple tenants, a user is typically associated with a particular tenant. For example, a user could be a salesperson of a company that is a tenant of the database system that provides a database service to the company and its employees.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (for example, a client, vendor, distributor, etc.) of the user, and can include information describing an entire company, subsidiaries, or contacts at the company. As another example, a record can be a project that the user is working on, such as an opportunity (for example, a possible sale) with an existing partner, or a project that the user is trying to get. In one implementation of a multi-tenant database system, each record for the tenants has a unique identifier stored in a common table. A record has data fields that are defined by the structure of the object (for example, fields of certain data types and purposes). A record also can have custom fields defined by a user. A field can be another record or include links to the record, thereby providing a parent-child relationship between the records.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes publications and other feed items that are about the group as a whole, the group's purpose, the group's description, and group records and other objects stored in association with the group. Threads of publications including group record updates and messages, such as posts, comments, likes, etc., can define group conversations and change over time.

The terms "network feed" and "feed" are used interchangeably herein and generally refer to a combination (for example, a list) of feed items or entries with various types of information and data. Such feed items can be stored and maintained in one or more database tables, for example, as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, feed items of information about a group can be presented in a group feed in the database, and feed items of information about a record can be presented in a record feed in the database, by way of example.

A user feed, a group feed and a record feed are examples of different network feeds. A second user following a first user, a first group, or a first record can receive the feed items associated with the first user, the first group and the first record for display in the second user's news feed, which is another type of network feed. In some implementations, the feed items from any number of followed users, groups and records can be combined into a single network feed of a particular user.

As examples, a feed item can be a message, such as a user-generated post of text data, and a "feed tracked" update to a profile, a group or a record, such as a change to a field of the record. Feed-tracked updates are described in greater detail below. A feed can be a combination of messages and feed-tracked updates. Messages include text created by a user, and may include other data as well. Examples of messages include posts, user status updates, and comments. Messages can be created for a user's profile, for a group, or for a record. Posts can be created by various users, potentially any user, although some restrictions can be applied. As an example, posts can be made to a wall section of a user's profile page (which can include a number of recent posts), a section of a group that includes multiple posts, or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A group or a record also can have a status, the update of which can be provided by an owner of the group or the record, respectively, or other users having suitable write access permissions to the group or record. The owner can be a single user or multiple users.

In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item.

A "feed-tracked update," also referred to herein as a "feed update," is one type of publication and generally refers to data representing an event. A feed-tracked update can include text generated by the database system in response to the event, to be provided as one or more feed items for possible inclusion in one or more feeds. In one implementation, the data can initially be stored, and then the database system can later use the data to create text for describing the event. Both the data and the text can be a feed-tracked update, as used herein. In various implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of the record. For example, the feed can be stored as a child object of the record.

An "entity feed" such as a "record feed" generally refers to a feed of feed items about a particular entity such as a record in the database, such as feed-tracked updates about changes to the record and posts made by users about the record. An entity feed can be composed of any type of feed item. Such a feed can be displayed on a page such as a web page associated with the record, for example, a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed-tracked updates initiated based on actions of the particular user.

I. General Overview

Systems, apparatus, and methods are provided for implementing enterprise level social and business information collaboration and networking. Such implementations can provide more efficient use of a database system. For instance, a user of a database system may not easily know when important information in the database has changed, for example, about a project or client. Implementations can provide feed-tracked updates about such changes and other events, thereby keeping users informed.

By way of example, a user can update a record in the form of a CRM object, for example, an opportunity such as a possible sale of 1000 computers. Once the record update has been made, a feed-tracked update about the record update can then automatically be provided, for example, in a feed, to anyone subscribing to the record or to the user. Thus, the user does not need to contact a manager regarding the change in the opportunity, since the feed-tracked update about the update is sent via a feed right to the manager's feed page or other page.

Next, mechanisms and methods for providing systems implementing enterprise level social and business information collaboration and networking will be described with reference to several implementations. First, an overview of an example of a database system is described. Next, examples of tracking events for a record, group or user, and messages about record, group or user or record are described. Various implementations about the data structure of feeds, customizing feeds, user selection of records, groups and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In some other implementations, environment 10 may not have all of these components or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, or a network of such computing devices. As illustrated in FIG. 1A (and in more detail in FIG. 1B) user systems 12 can interact via a network 14 with an on-demand database service, which is implemented in the example of FIG. 1A as database system 16.

An on-demand database service, implemented using system 16 by way of example, is a service that is made available to outside users, who do not need to necessarily be concerned with building or maintaining the database system. Instead, the database system may be available for their use when the users need the database system; that is, on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware or software, for example, the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 can be entirely determined by permissions (permission levels) for the current user. For example, where a salesperson is using a particular user system 12 to interact with system 16, that user system has the capacities allotted to the salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the disclosed implementations can use are not so limited, although TCP/IP is a frequently implemented protocol.

User systems 12 can communicate with system 16 using TCP/IP and, at a higher network level, use other common Internet protocols to communicate, such as HTTP, FTP, AFS, WAP, etc. In an example where HTTP is used, user system 12 can include an HTTP client commonly referred to as a "browser" for sending and receiving HTTP signals to and from an HTTP server at system 16. Such an HTTP server can be implemented as the sole network interface 20 between system 16 and network 14, but other techniques can be used as well or instead. In some implementations, the network interface 20 between system 16 and network 14 includes load sharing functionality, such as round-robin HTTP request distributors to balance loads and distribute incoming HTTP requests evenly over a number of servers. At least for users accessing system 16, each of the servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Web page content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
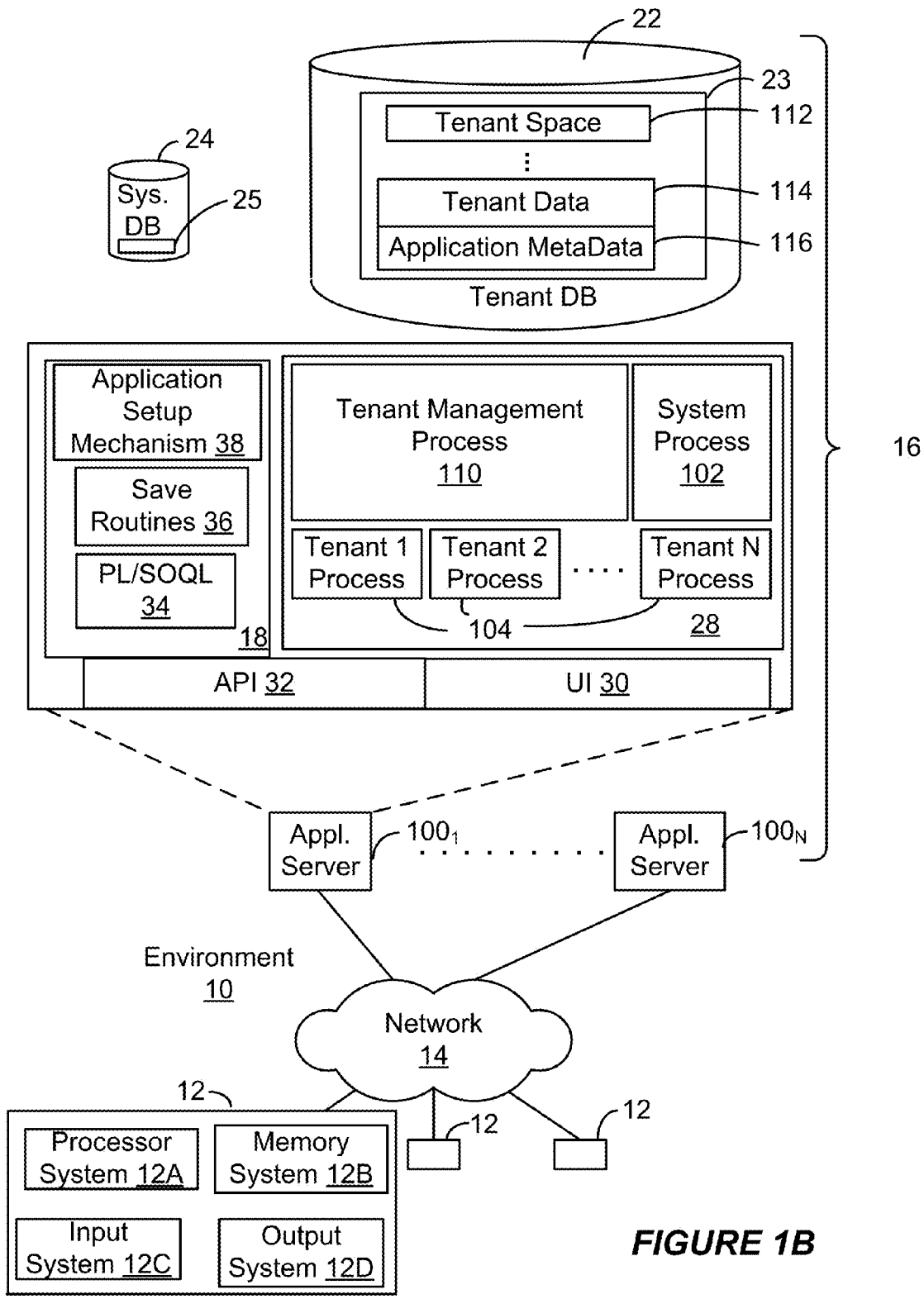
FIG. 1B shows a system diagram further illustrating an example of architectural components of an on-demand service environment, in accordance with some implementations.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include existing, well-known elements that are explained only briefly here. For example, each user system 12 could include a desktop personal computer, workstation, laptop, PDA, cell phone, or any wireless access protocol (WAP)-enabled device or any other computing device capable of interfacing directly or indirectly to the Internet or other network. The term "computing device" also is referred to herein simply as a "computer". User system 12 typically runs an HTTP client, for example, a browsing program, such as a web browser based on the WEBKIT platform, Microsoft's Internet Explorer browser, Netscape's Navigator browser, Opera's browser, Mozilla's Firefox browser, or a WAP-enabled browser in the case of a cellular phone, smartphone, PDA or other wireless device, or the like, allowing a user (for example, subscriber of the multi-tenant database system) of user system 12 to access, process and view information, pages and applications available to it from system 16 over network 14. Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to some implementations, each user system 12 and all of its components are operator-configurable using applications, such as a browser, including computer code run using a central processing unit such as an Intel Pentium® processor or the like. Similarly, system 16 (and additional instances of an MTS, where more than one is present) and all of its components can be operator-configurable using application(s) including computer code to run using processor system 17, which may be implemented to include a central processing unit, which may include an Intel Pentium® processor or the like, or multiple processor units. Tangible computer-readable media can have non-transitory instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a client system or server or server system such as, for example, C, C++, HTML, any other markup language, Java™, JavaScript, ActiveX, any other scripting language, such as VBScript, and many other programming languages as are well known may be used. (JAVA™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B, elements of system 16 and various interconnections in some implementations are illustrated with more specificity. FIG. 1B shows that user system 12 can include processor system 12A, memory system 12B, input system 12C, and output system 12D. FIG. 1B shows network 14 and system 16. FIG. 1B also shows that system 16 can include tenant data storage 22, tenant data 23, system data storage 24, system data 25, User Interface (UI) 30, Application Program Interface (API) 32, PL/SOQL 34, save routines 36, application setup mechanism 38, application servers $100_1$-$100_N$, system process space 102, tenant process spaces 104, tenant management process space 110, tenant storage space 112, user storage 114, and application metadata 116. In other implementations, environment 10 may not have the same elements as those listed above or may have other elements instead of, or in addition to, those listed above.

Regarding user system 12, processor system 12A may be any combination of one or more processors. Memory system 12B can include any combination of one or more memory devices, short term, or long term memory. Input system 12C can include any combination of input devices, such as one or more keyboards, mice, trackballs, scanners, cameras, or interfaces to networks. Output system 12D can include any combination of output devices, such as one or more monitors, printers, or interfaces to networks. As shown by FIG. 1B, system 16 also includes a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100, also referred to herein as an "app server", may be configured to communicate with tenant data storage 22 and the tenant data 23 therein, and system data storage 24 and the system data 25 therein to serve requests of user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112. A UI 30 provides a user interface and an API 32 provides an application programmer interface to system 16 resident processes to users or developers at user systems 12. The tenant data and the system data can be stored in various databases, such as one or more Oracle® databases.

Application platform 18 includes an application setup mechanism 38 that supports application developers' creation and management of applications, which can be saved as metadata into tenant data storage 22 by save routines 36 for execution by subscribers as one or more tenant process spaces 104 managed by tenant management process 110 for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled to database systems, for example, having access to system data 25 and tenant data 23, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the database system. However, it will be apparent to one skilled in the art that other transport protocols can be used to optimize the system depending on the network interconnect used.

In some implementations, each application server 100 is configured to handle requests for any user associated with any organization that is a tenant. Because it can be desirable to be able to add and remove application servers from the server pool at any time and for any reason, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in one implementation, three consecutive requests from the same user could hit three different application servers 100, and three requests from different users could hit the same application server 100. In this manner, by way of example, system 16 is a multi-tenant system in which system 16 handles storage of, and access to, different objects, data and applications across disparate users and organizations.

As an example of storage, one tenant can be a company that employs a sales force where each salesperson uses system 16 to manage their sales process. A user can maintain contact data, leads data, customer follow-up data, performance data, goals and progress data, etc., all applicable to that user's personal sales process (for example, in tenant data storage 22). In an example of a MTS arrangement, because all of the data and the applications to access, view, modify, report, transmit, calculate, etc., can be maintained and accessed by a user system having little or nothing more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be separate from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, system 16 also can maintain system level data usable by multiple tenants or other data. Such system level data can include industry reports, news, postings, and the like that are sharable among tenants.

In certain implementations, user systems 12 (which can be client systems) communicate with application servers 100 to request and update system-level and tenant-level data from system 16 that can involve sending one or more queries to tenant data storage 22 or system data storage 24. System 16 (for example, an application server 100 in system 16) can automatically generate one or more SQL statements (for example, one or more SQL queries) designed to access the desired information. System data storage 24 can generate query plans to access the requested data from the database.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some multi-tenant database systems, standard entity tables can be provided for use by all tenants. For CRM database applications, such standard entities can include tables for case, account, contact, lead, and opportunity data objects, each containing pre-defined fields. It should be understood that the word "entity" also may be used interchangeably herein with "object" and "table".

In some multi-tenant database systems, tenants are allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
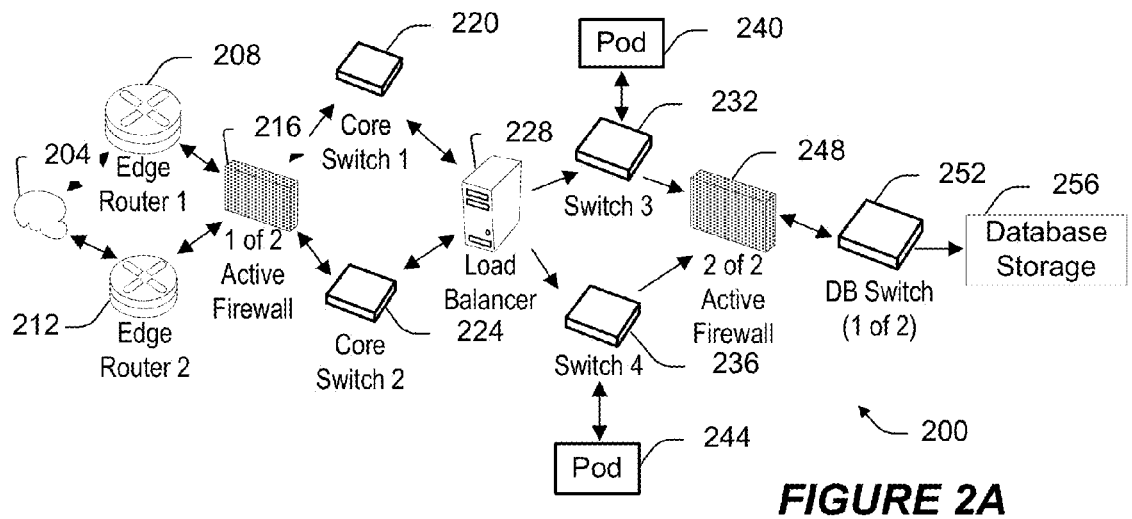
FIG. 2A shows a system diagram illustrating an example of the architecture of a multitenant database environment, in accordance with some implementations.

FIG. 2A shows a system diagram illustrating an example of architectural components of an on-demand database service environment 200 according to some implementations. A client machine located in the cloud 204, generally referring to one or more networks in combination, as described herein, can communicate with the on-demand database service environment via one or more edge routers 208 and 212. A client machine can be any of the examples of user systems 12 described above. The edge routers can communicate with one or more core switches 220 and 224 via firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with a database storage 256 via a database firewall 248 and a database switch 252.

Figure 2B:
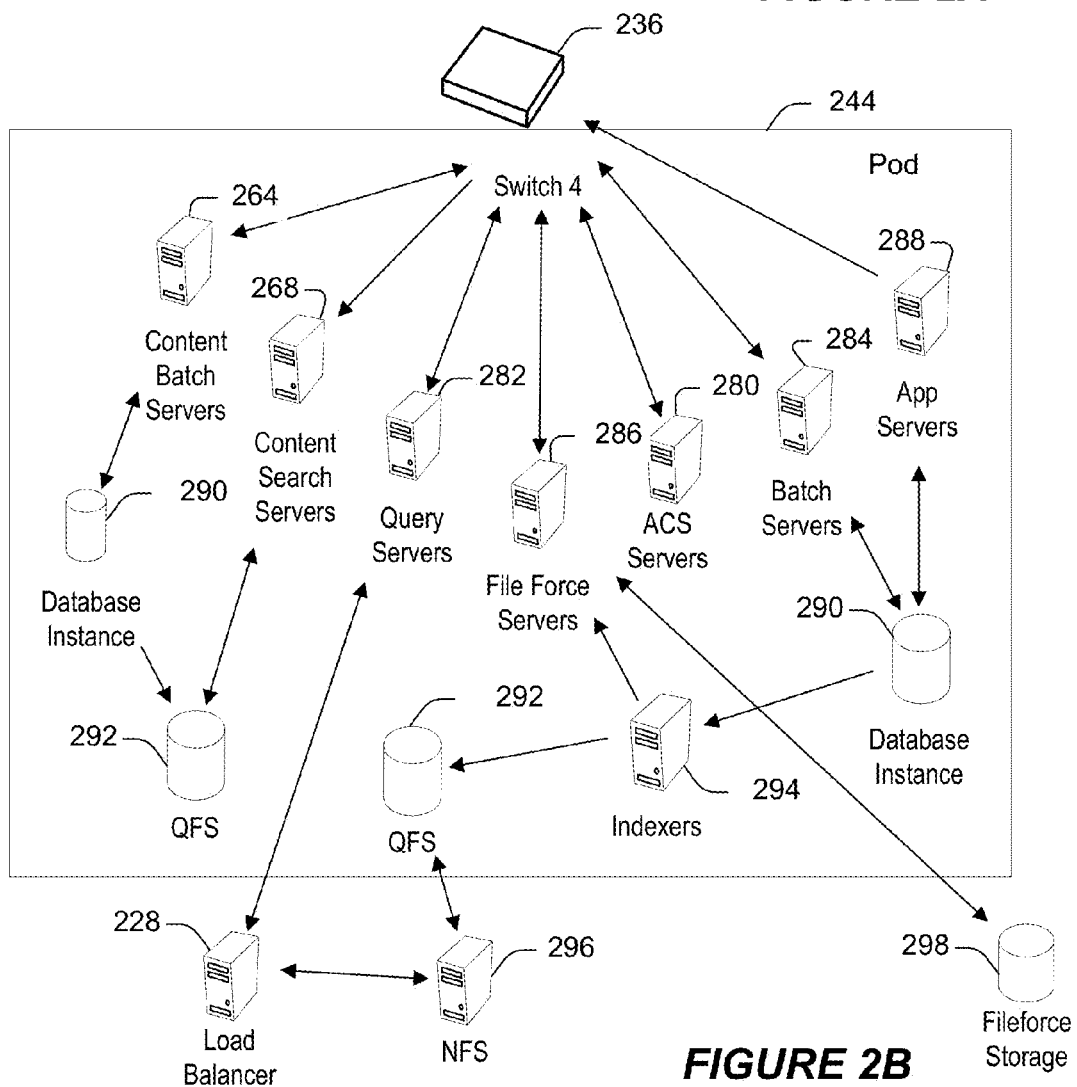
FIG. 2B shows a system diagram further illustrating an example of the architecture of a multitenant database environment, in accordance with some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Moreover, one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any hardware and software configured to provide the described functionality.

The cloud 204 is intended to refer to a data network or multiple data networks, often including the Internet. Client machines located in the cloud 204 can communicate with the on-demand database service environment to access services provided by the on-demand database service environment. For example, client machines can access the on-demand database service environment to retrieve, store, edit, or process information.

In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In one or more implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B.

In some implementations, communication between the pods 240 and 244 is conducted via the pod switches 232 and 236. The pod switches 232 and 236 can facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure.

In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256.

In some implementations, the database storage 256 is an on-demand database system shared by many different organizations. The on-demand database system can employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of methods described with reference to FIGS. 3-10C. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks.

The content search servers 268 can provide query and indexer functions. For example, the functions provided by the content search servers 268 can allow users to search through content stored in the on-demand database service environment.

The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced.

The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources.

In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed.

In some implementations, queries from the query servers 222 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call.

In some implementations, database information is transmitted to the indexer 294. Indexer 294 can provide an index of information available in the database 290 or QFS 292. The index information can be provided to file force servers 286 or the QFS 292.

III. Customizing a Data Interface

Figure 3:
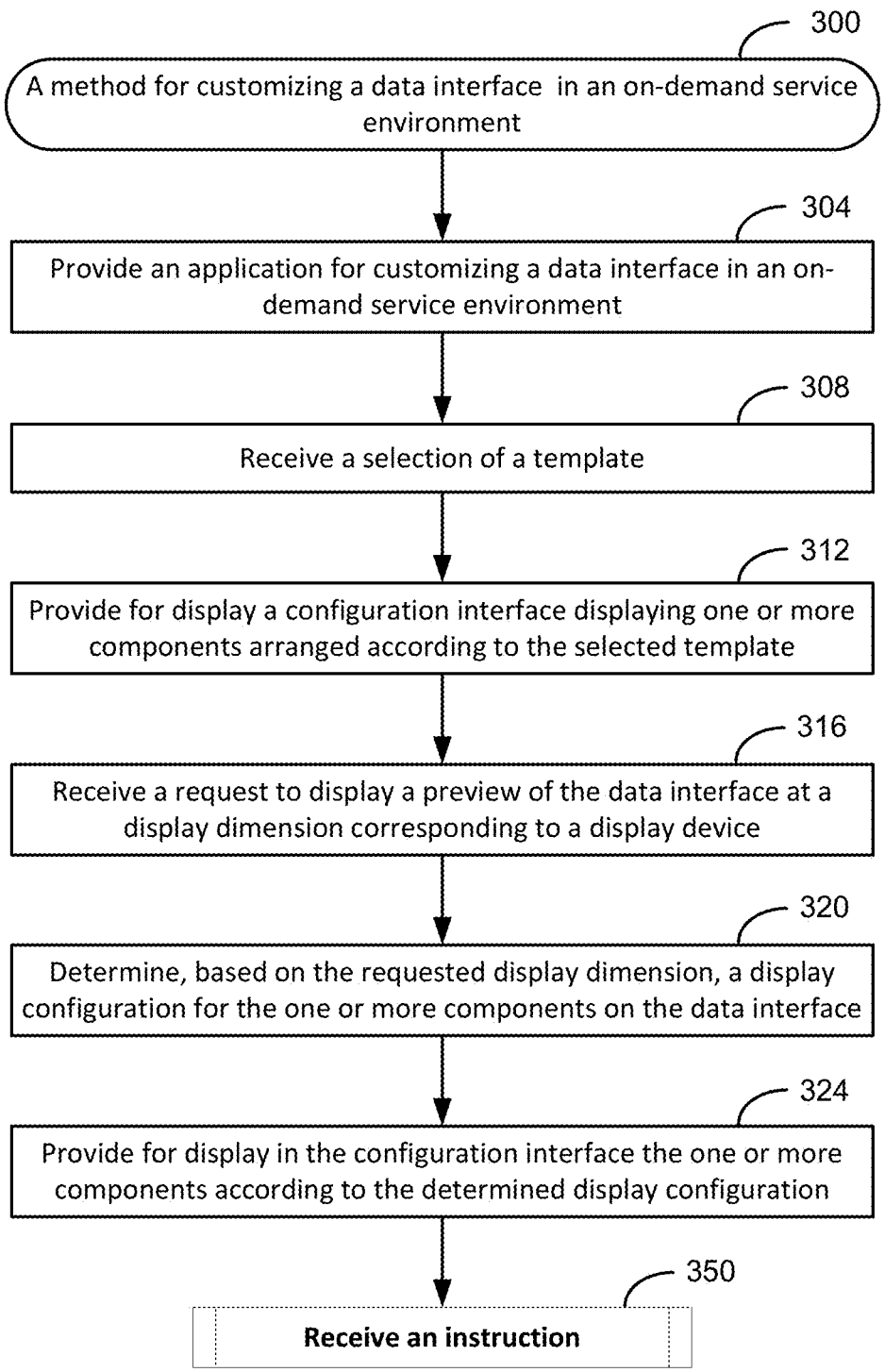
FIG. 3 shows a flowchart of an example of a computer implemented method 300 for customizing a data interface in an on-demand service environment, in accordance with some implementations.

FIG. 3 shows a flowchart of an example of a computer implemented method 300 for customizing a data interface in an on-demand service environment, in accordance with some implementations. The method 300 can be performed by or using any suitable computing device, computing system or any number of computing devices or systems that may cooperate to perform the method 300. In some implementations, each of the blocks of the method 300 can be performed wholly or partially by or using the database system 16 of FIGS. 1A and 1B, or other suitable devices or components (including processors) described herein, or the like.

In FIG. 3, at block 304, a computing device of an on-demand service environment provides an application for customizing a data interface in the on-demand service environment. The application may provide one or more configurable templates. In some implementations, the data interface is displayable on a plurality of display devices having different form factors.

In some implementations, the application may be a web page displayed in a web browser, allowing a user to build a data interface to access data of the on-demand service environment. In other implementations, the application may be provided as a mobile device application for a smartphone, tablet, or other mobile device. The application may provide a drag-and-drop user interface for building the data interface. The data interface may also be customized with a client-specific themed template.

In some implementations, the data interface provides data for records of the on-demand service environment. The data may be organized and presented in one or more components of the data interface to allow a user to solve a business goal. For example, the data interface may provide information pertaining to a user's upcoming tasks or groups that the user is following. The data interface may also provide a feed component to allow the user to utilize an information feed to interact with users and records of the on-demand service environment.

In some implementations, the plurality of display devices having different form factors may include a desktop computer display, a laptop display, a tablet display, a smartphone display, a smartwatch display, or other mobile device display. Depending on the form factor or size of the display device, the components of the data interface may be presented in various display configurations. A display configuration for the data interface may comprise a particular arrangement of the components in the data interface. For example, the data interface may be presented with the components in a single column when the display device is a smaller display, such as a smartphone or smartwatch display. Alternatively, a single-column configuration may be used when the display is a large display, such as high-resolution desktop display, but the web browser size is set to a smaller size. Accordingly, the data interface may be presented in multiple columns when the display device is larger, such as on a desktop display.

In FIG. 3, at block 308, the computing device performing method 300 receives a selection of a template of the one or more configurable templates. In some implementations, the configurable templates may be presented according to template type. In some implementations, the configurable templates may use a client-specific theme that a client may customize and brand and provide for use to its users.

Figure 6:
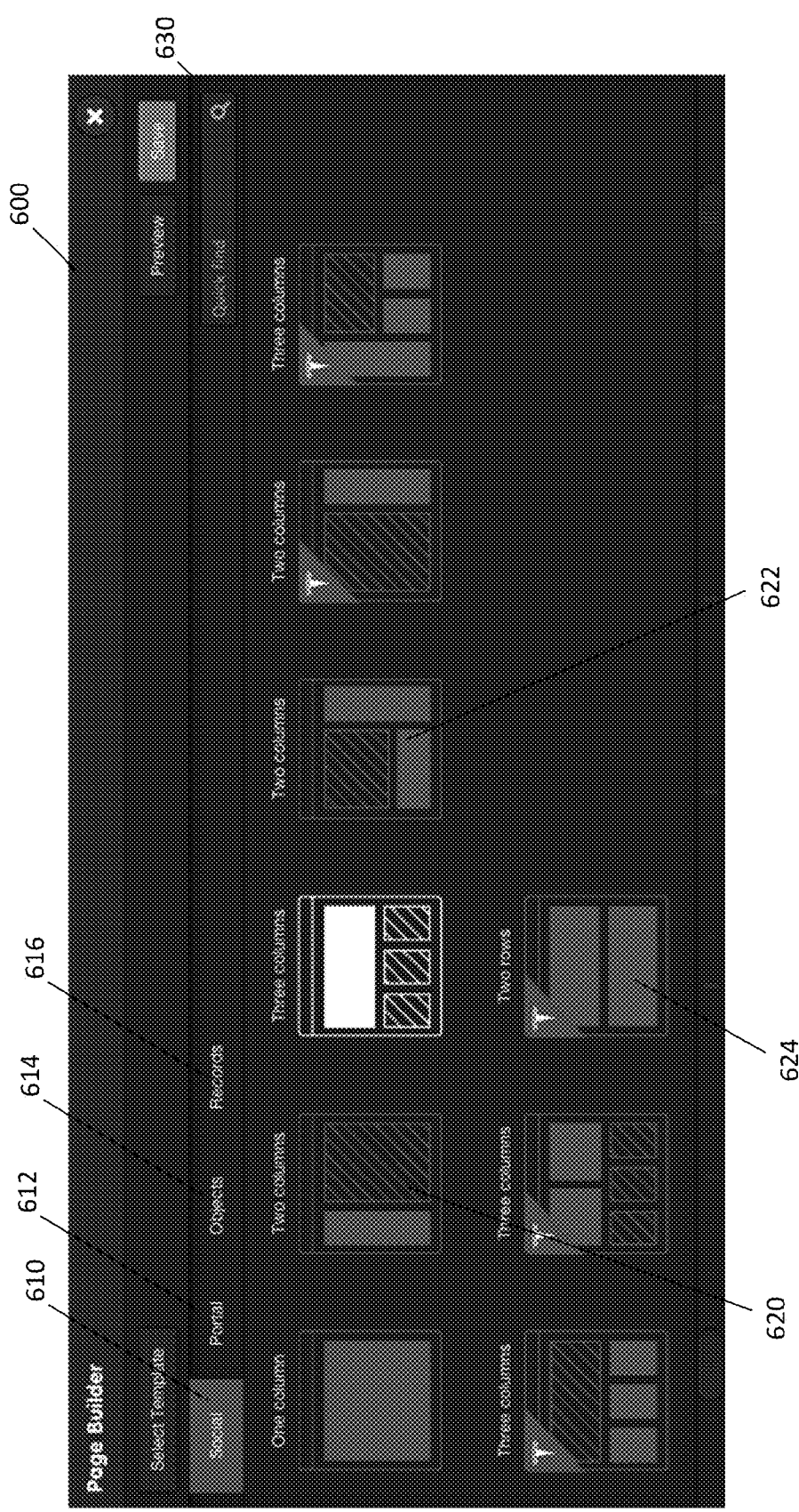
FIG. 6 shows an example of a graphical user interface (GUI) 600 displaying configurable templates, in accordance with one or more implementations.

FIG. 6 shows an example of a graphical user interface (GUI) 600 displaying configurable templates, in accordance with one or more implementations. The user interface includes one or more template types, such as social 610, portal 612, objects 614, and records 616. A social-type template may be used to display a social feed of the on-demand service environment with a publisher component and one or more components for displaying data of the on-demand service environment. A portal-type template may be used to provide a themed customer portal data interface for customers to access CRM database content or other data of an on-demand service environment. A object-type or record-type template may be used to provide a data interface for accessing data pertaining to a particular object, record, object type, or record type. The user interface 600 may present the templates according to template type. In one implementation, the listing of configurable templates may include the most recently used templates in the application. In another implementation, the listing may include the most frequently used templates in the application. The listing may also include templates developed by third-party developers, partners, or independent software vendors. Any one of the configurable templates may be selected by the user for use in the data interface. As an example, the two-column template 620 may include a first column containing an information feed and publisher, and a second column listing one or more components for presenting data. As another example, the two-row template 624 is an example of a client-specific themed template that has been configured for Tesla Corporation. This template may include a color scheme, header, or other user interface features that reflect the Tesla brand. The other two-column template 622 may include a different configuration of components in two-column format. A search box 630 may be provided to allow the user to search for a particular template.

In FIG. 3, at block 312, the computing device performing method 300 provides for display a configuration interface of the application, the configuration interface displaying one or more components arranged according to the selected template.

Figure 7:
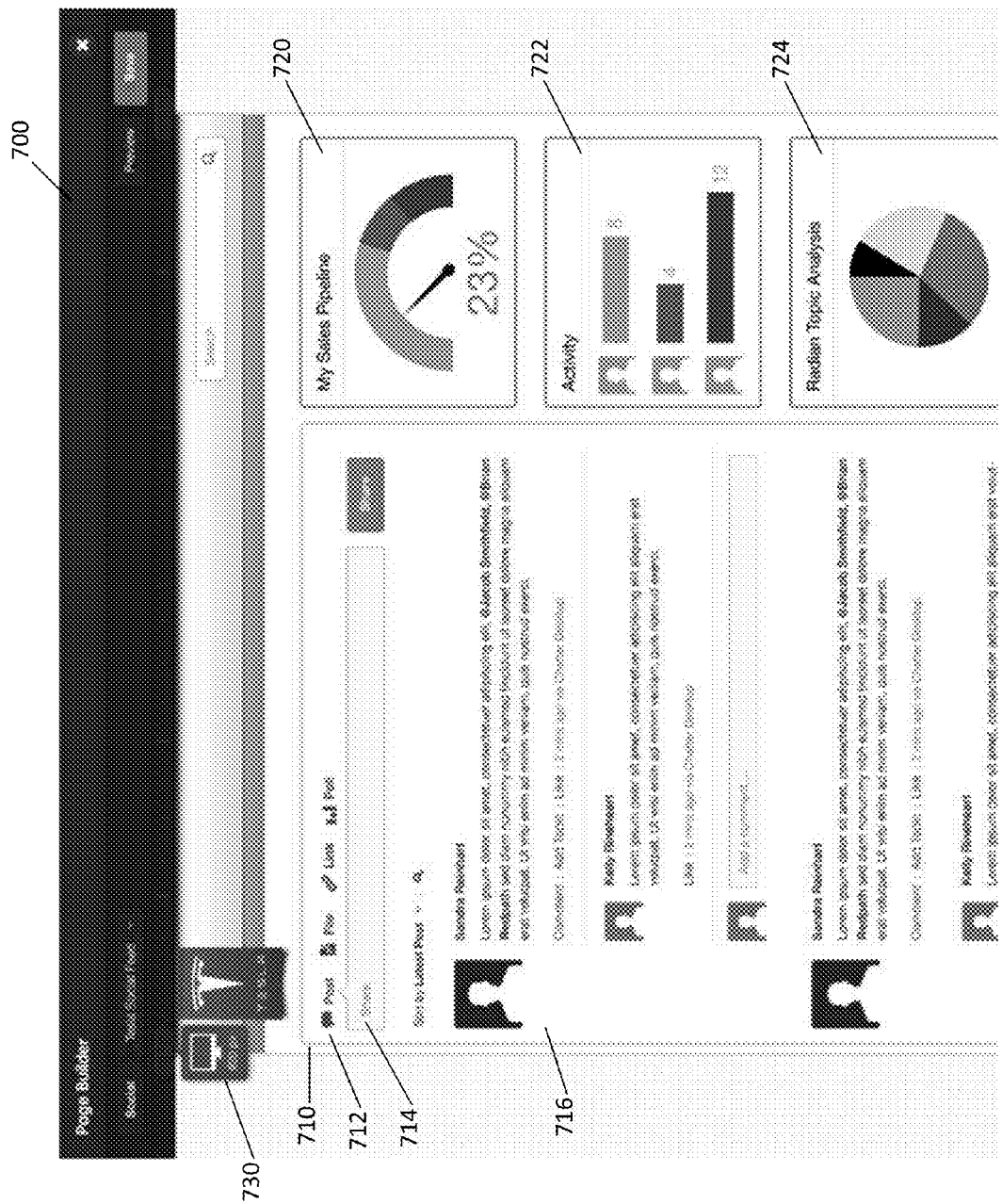
FIG. 7 shows an example of a GUI displaying a configuration interface 700 containing one or more configurable components, in accordance with one or more implementations.

FIG. 7 shows an example of a GUI displaying a configuration interface 700 containing one or more configurable components, in accordance with one or more implementations. The configuration interface 700 includes a feed component 710 in the first column and three components 720, 722, 724 in the second column, which display data of the on-demand service environment. The feed component 710 includes a preview of how an information feed will appear in the data interface, including one or more publisher actions 712, a publisher textbox 714, and one or more feed items 716. The configuration interface 700 also includes a slider bar that determines the display width for the data interface being created. Here, the width of the selected template is preset to "920px", or 920 pixels, corresponding to a larger display size, such as a desktop screen or a web page viewed on a larger display monitor. At this initial position, the feed component 710 is displayed in a first column, and the three components 720, 722, 724 are displayed in a second column.

In FIG. 3, at block 316, the computing device performing method 300 receives a request to display a preview of the data interface at a display dimension corresponding to a display device of the plurality of display devices, the display device having a form factor. In some implementations, the requested display dimension may be one of: a display width, a display height, a display depth, or an aspect ratio of one or more dimensions. The requested display dimension may be provided as a number of pixels, a display resolution, or any other representation of display size. In some implementations, the display dimension may correspond to a size of a web browser window or application window displaying the data interface on a display device.

Figure 8A:
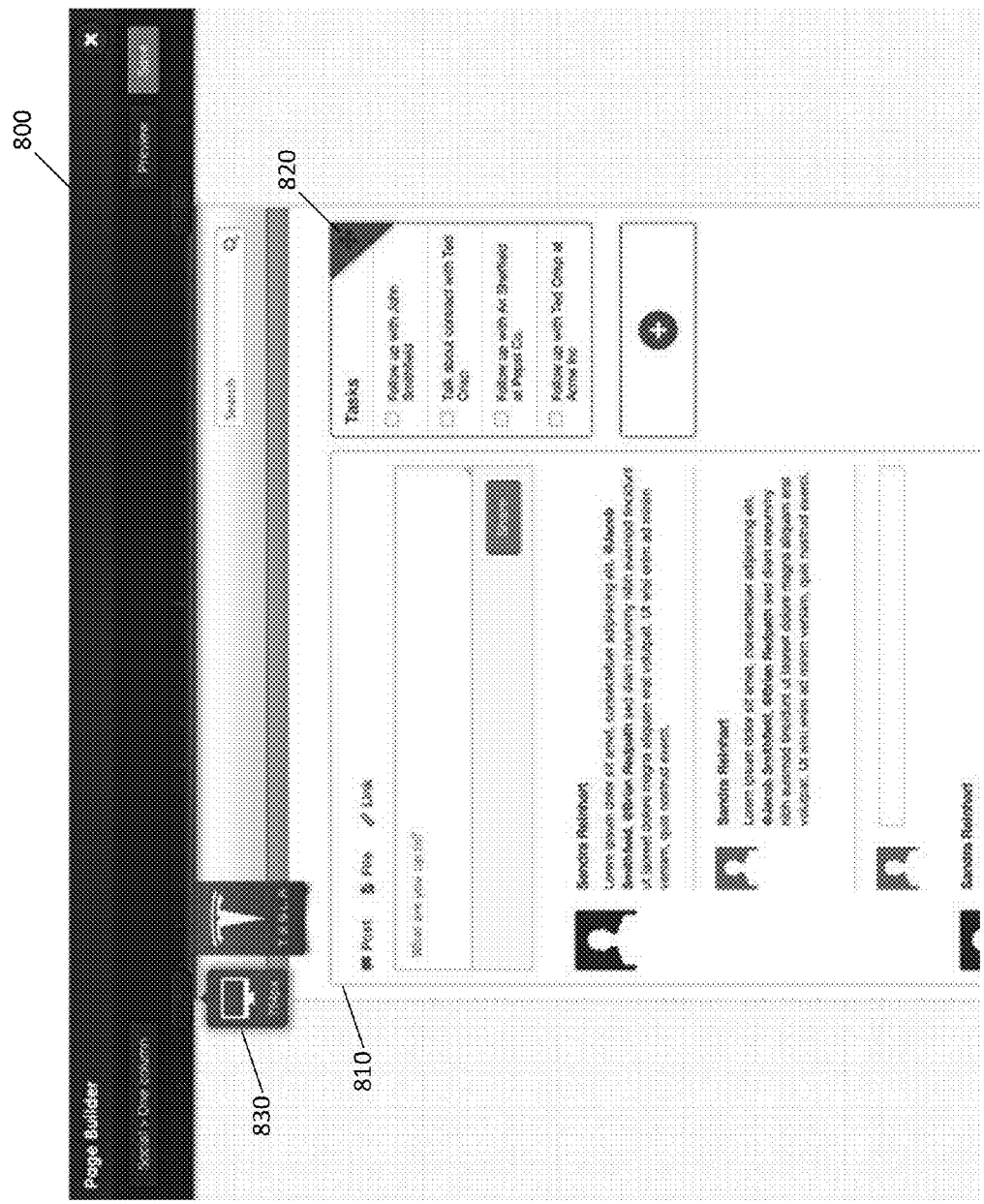
FIGS. 8A-8C show examples of different states of a GUI displaying a configuration interface 800 containing one or more configurable components, in accordance with one or more implementations.

FIG. 8A shows an example of a GUI displaying a configuration interface 800 containing one or more configurable components, in accordance with one or more implementations. The configuration interface 800 of FIG. 8A shows a preview of how the data interface will appear on a display device having a display width of 794 pixels. The configuration interface 800 includes a feed component 810 in the first column and a tasks component 820 in the second column. The slider bar 830 has been dragged toward the center of the configuration interface 800 to automatically shrink and rearrange the components of the data interface accordingly, such that the data interface is arranged and optimally displayed for the display width of 794 pixels.

In some implementations, the requested display width may be indicated by a slider bar as in the case of FIG. 8A. In other implementations, a user may specify a display width in number of pixels or inches. The user may also designate a display height or other description of display size. In another implementation, a user may designate a display device type, such as a smartphone, tablet, or desktop display, and the display device type may be associated with a default display width corresponding to the device type. For example, if the user designates a smartphone display device, then a display width of 550 pixels, or something similar, may be requested.

In FIG. 3, at block 320, the computing device performing method 300 determines, based on the requested display dimension, a display configuration for the one or more components on the data interface.

In some implementations, the determined display configuration may designate an order in which the one or more components of the data interface are to be displayed. For example, at a larger display width, it may be preferred for a tasks component to appear at the top of the third column and a groups component to appear at the top of the second column and the feed component to appear in the first component. But at a smaller display width, it may be preferred for the feed component to be displayed, followed by the groups component, then the tasks component, all in a single column.

In other implementations, the determined display configuration may designate sizes of text or images in the one or more components. For example, as the display width gets smaller, the component size may get smaller; the text in the components may get smaller as well, or less of the text may be displayed; and the images displayed in the components may shrink, so that the components are optimally displayed at requested display width. As another example, text wrapping within each component may change as the text sizes change and the component sizes change.

The display configuration may also designate that certain components be hidden or other components be displayed, depending on the requested display dimensions. For example, it may be preferred for a particular component to appear in the user interface only if the display width is large enough to accommodate multiple columns. In the case of a mobile device, where the display width may optimally display only one column, the display configuration may designate that particular components not be displayed in the data interface.

Additionally, the display configuration may designate that a component display more or less information depending on how many columns are being utilized to display the data interface. For example, the display configuration may designate that the feed component display fewer feed items when only one column is being displayed. The feed component may display more feed items when multiple columns are displayed.

In some implementations, one or more of the components of the configuration interface may be relevant only when data interface is presented on a mobile device, such as a smartphone. As an example, a mobile card consisting of a box that includes an account name and a few fields may provide a snapshot of an account record on a mobile device. Another example may be a map component displayed on a mobile device. In these implementations, when a display dimension corresponding to a mobile device form factor, such as a smartphone, is selected, the mobile components may be included in the configuration interface. Similarly, when the display dimension corresponds to a non-mobile device, such as a desktop computer display, the mobile components may be hidden and not included in the display configuration.

The display configuration may also designate a number of columns to utilize in displaying the components. The computing device may refer to breakpoint display widths to determine how many columns to use given a particular display width. For example, 560 pixels may be the breakpoint below which one column should be used and above which two columns should be used. As another example, 800 pixels could be the breakpoint above which three columns should be used. It will be understood that any display dimension value may be used for determining the number of columns to use for the data interface.

Figure 8B:
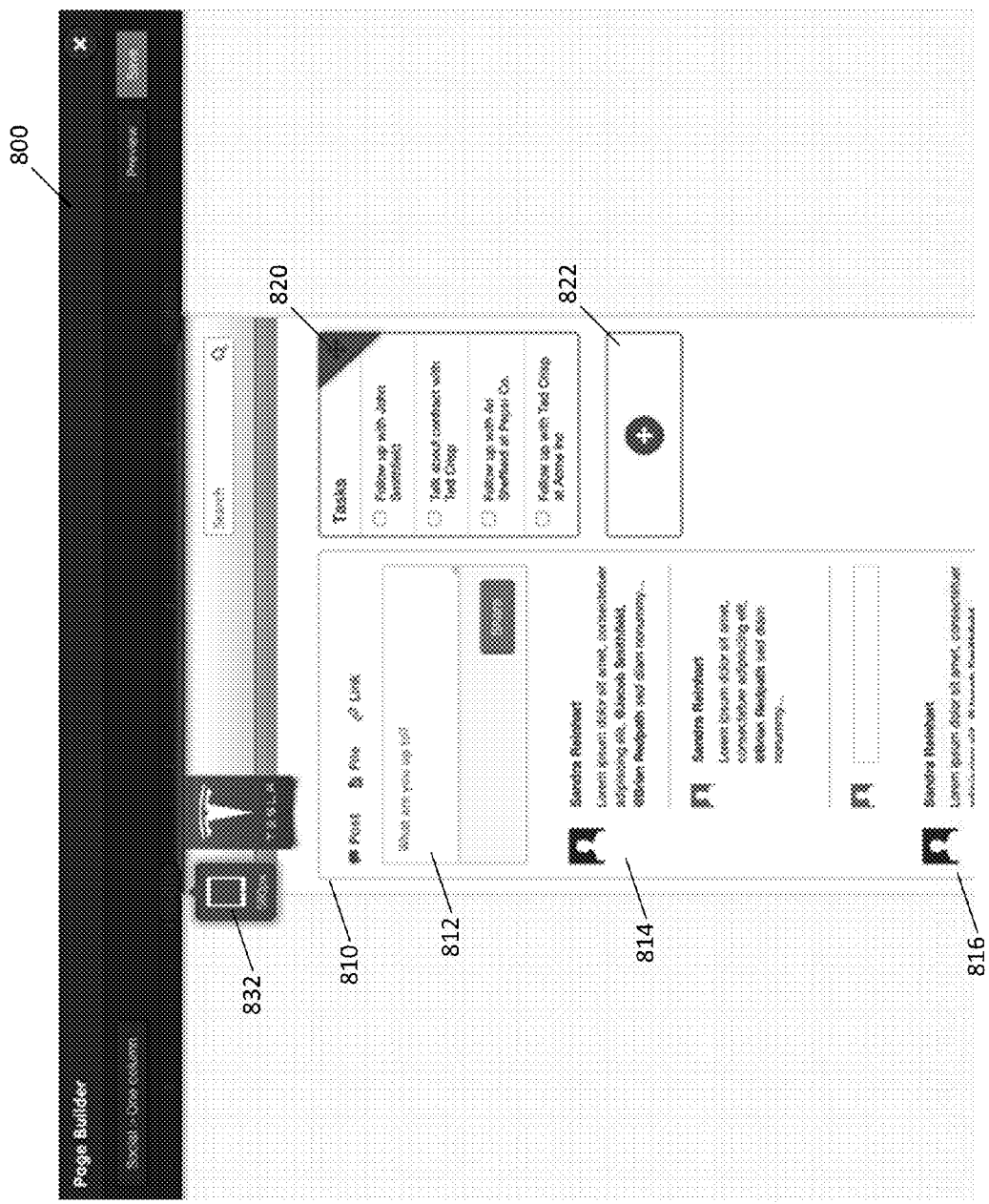

FIG. 8B shows an example of a GUI displaying a configuration interface 800 containing one or more configurable components, in accordance with one or more implementations. The configuration interface 800 of FIG. 8B shows a preview of how the data interface will appear on a display device having a display width of 580 pixels. In FIG. 8B, the user has dragged the slider bar 832 to a display width of 580 pixels to correspond to a tablet display form factor. Comparing the components of FIG. 8B with the components of FIG. 8A, the feed component 810 has shrunk, with the text box 812 becoming narrower. The feed items 814 and 816 are also narrower and the text wrapping and amount of text displayed have been adjusted accordingly. The tasks component 820 is also narrower with the text wrapping adjusted accordingly.

Figure 8C:
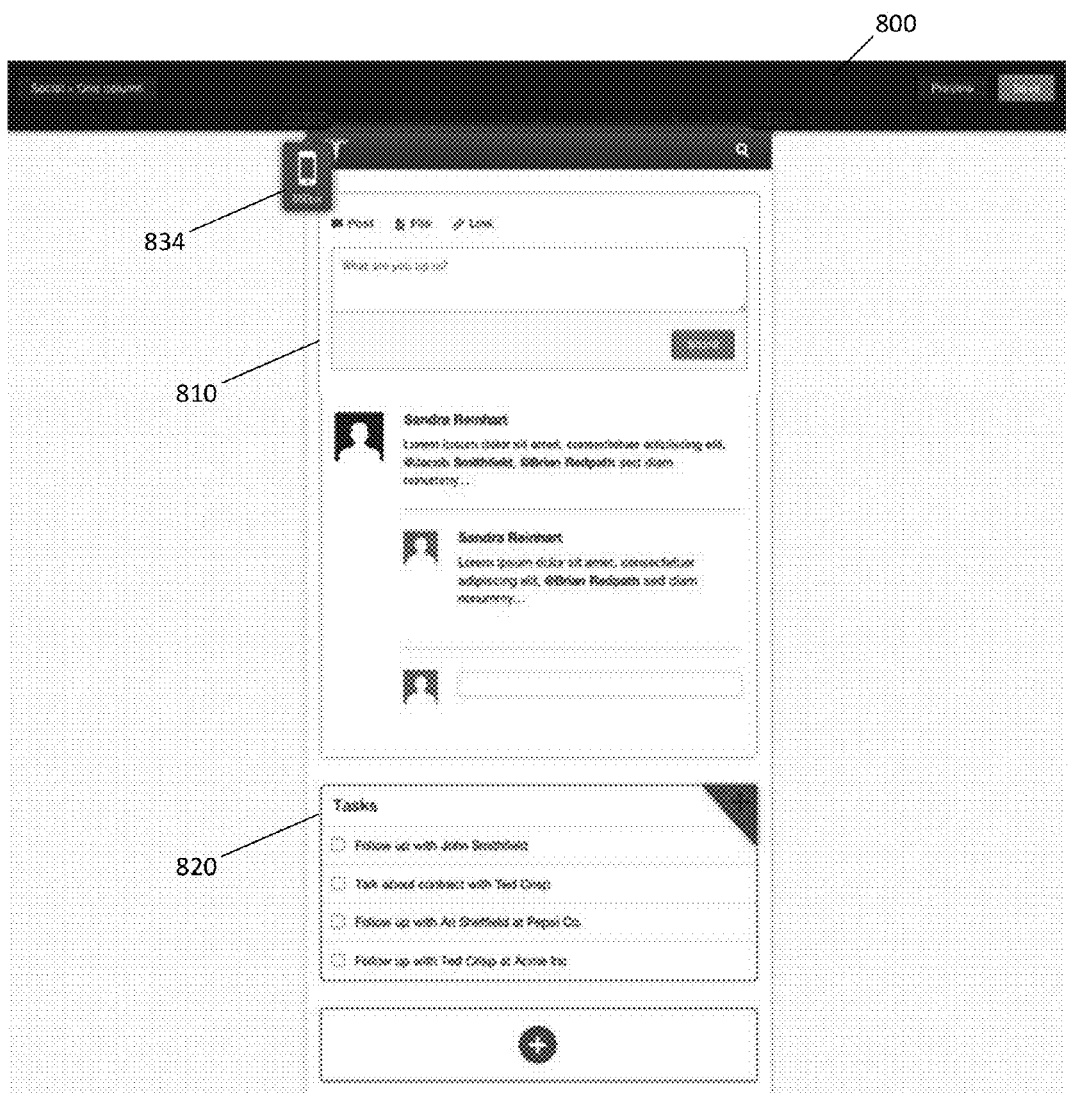

FIG. 8C shows an example of a GUI displaying a configuration interface 800 containing one or more configurable components, in accordance with one or more implementations. The configuration interface 800 of FIG. 8C shows a preview of how the data interface will appear on a display device having a display width of 550 pixels. In FIG. 8C, the user has dragged the slider bar 834 to a display width of 550 pixels to correspond to a smartphone display form factor. In response to the user's action, the components of the configuration interface 800 have been rearranged into a single column. Compared to the configuration interface of FIG. 8B, the feed component 810 is wider. Also, the feed component 810 displays fewer feed items. Because the other components have been moved to below the feed component, displaying fewer feed items in the feed component may be advantageous so that the user can view other components without having to scroll very far down the interface. The tasks component 820 has been moved to the single column below the feed component.

In FIG. 3, at block 324, the computing device performing method 300 provides for display in the configuration interface the one or more components according to the determined display configuration. In some implementations, determining the display configuration and providing for display the components according to the determined display configuration are performed in near real-time in response to receiving the request to display the preview of the data interface. This may provide the user fluid control over how the components are displayed in the configuration interface. The user may drag the scroll bar from a wider display width to a narrower display width and see the components resizing and rearranging accordingly. This allows a user to easily design the application for display on multiple devices having different screen sizes.

Figure 4:
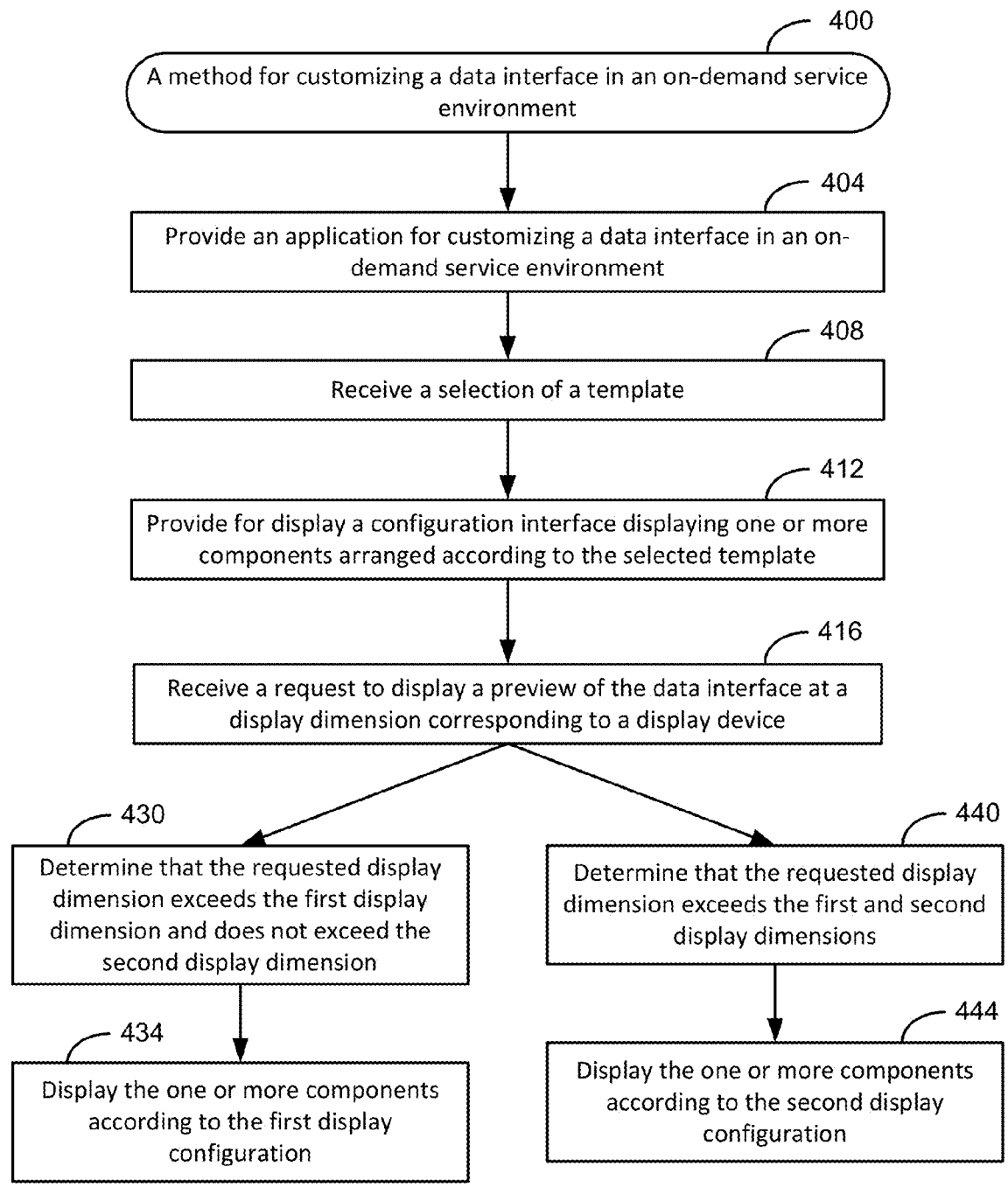
FIG. 4 shows a flowchart of an example of a computer implemented method 400 for customizing a data interface in an on-demand service environment, in accordance with some implementations.

FIG. 4 shows a flowchart of an example of a computer implemented method 400 for customizing a data interface in an on-demand service environment, in accordance with some implementations. The method 400 can be performed by or using any suitable computing device, computing system or any number of computing devices or systems that may cooperate to perform the method 400. In some implementations, each of the blocks of the method 400 can be performed wholly or partially by or using the database system 16 of FIGS. 1A and 1B, or other suitable devices or components (including processors) described herein, or the like.

In FIG. 4, at block 404, a computing device of an on-demand service environment provides an application for customizing a data interface in the on-demand service environment, as generally described above at block 304 of FIG. 3.

In FIG. 4, at block 408, the computing device performing method 400 receives a selection of a template of the one or more configurable templates, as generally described above at block 308 of FIG. 3.

In FIG. 4, at block 412, the computing device performing method 400 provides for display a configuration interface of the application, the configuration interface displaying one or more components arranged according to the selected template, as generally described above at block 312 of FIG. 3.

In FIG. 4, at block 416, the computing device performing method 400 receives a request to display a preview of the data interface at a display dimension corresponding to a display device of the plurality of display devices, the display device having a form factor, as generally described above at block 316 of FIG. 3.

In FIG. 4, at block 430, the computing device performing method 400 determines a display configuration for the one or more components on the data interface by determining that the requested display dimension exceeds a first display dimension and does not exceed a second display dimension. The first display dimension is associated with a first display configuration, and the second display dimension is associated with a second display configuration. The second display dimension is greater than the first display dimension.

As an example, a first display width of 500 pixels may be associated with a first display configuration that includes displaying the components of the data interface in a single column. A second display width of 560 pixels may be associated with a second display configuration that includes displaying the components of the data interface in two columns. The user may drag the slider bar of the configuration interface to a position corresponding to 550 pixels, which is greater than the first display width but less than the second display width.

In FIG. 4, at block 434, the computing device performing method 400 displays the one or more components according to the first display configuration. In the above example, the computing device determines that the requested display width (550 pixels) is greater than the first display width (500 pixels) but does not exceed the second display width (560 pixels). The computing device may then display the one or more components according to the first display configuration, which displays the components of the data interface in a single column.

In FIG. 4, at block 440, the computing device performing method 400 determines a display configuration for the one or more components on the data interface by determining that the requested display dimension exceeds a first and second display dimension. The first display dimension is associated with a first display configuration, and the second display dimension is associated with a second display configuration. The second display dimension is greater than the first display dimension.

As an example, a first display width of 500 pixels may be associated with a first display configuration that includes displaying the components of the data interface in a single column. A second display width of 560 pixels may be associated with a second display configuration that includes displaying the components of the data interface in two columns. The user may drag the slider bar of the configuration interface to a position corresponding to 580 pixels, which is greater than the first and second display widths.

In FIG. 4, at block 444, the computing device performing method 400 displays the one or more components according to the second display configuration. In the above example, the computing device determines that the requested display width (580 pixels) is greater than both the first (500 pixels) and second (560 pixels) display width. The computing device may then display the one or more components according to the second display configuration, which displays the components of the data interface in two columns.

Figure 5A:
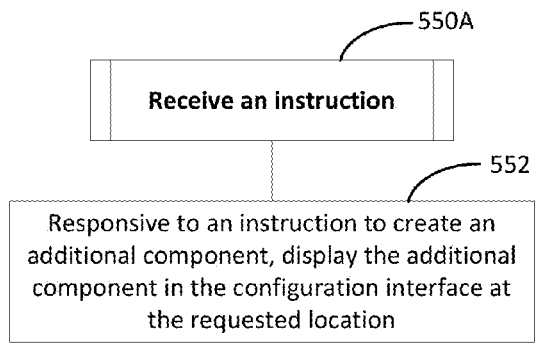
FIGS. 5A-5C show flowcharts of examples of computer implemented methods 550A-550C for receiving an instruction in accordance with method 300, in accordance with some implementations.
Figure 5B:
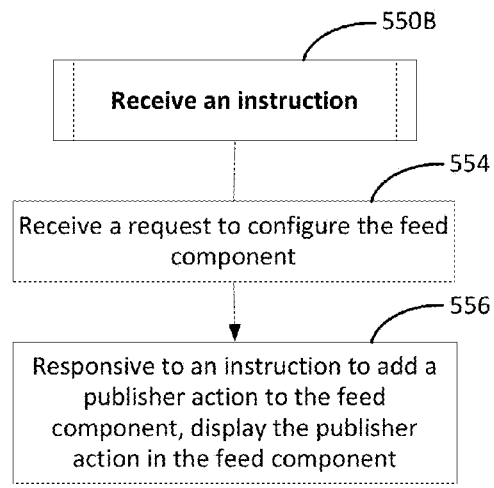
Figure 5C:
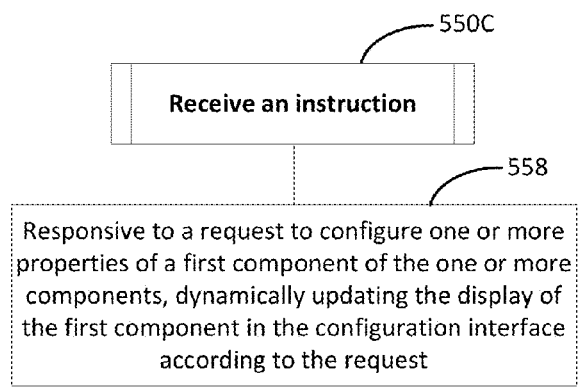

FIGS. 5A-5C show flowcharts of examples of computer implemented methods 550A-550C for customizing a data interface in an on-demand service environment, in accordance with some implementations. The methods 550A-550C can be performed by or using any suitable computing device, computing system or any number of computing devices or systems that may cooperate to perform the methods 550A-550C. In some implementations, each of the blocks of a method of FIGS. 5A-5C can be performed wholly or partially by or using the database system 16 of FIGS. 1A and 1B, or other suitable devices or components (including processors) described herein, or the like.

In FIG. 5A, at block 552, the computing device performing method 550A, receives an instruction to create an additional component. The instruction identifies a location in the configuration interface to display the requested additional component. Responsive to receiving the instruction, the computing device displays the additional component in the configuration interface at the requested location. In some implementations, the instruction to create the additional component identifies one or more records stored in a database of the on-demand service environment. The additional component may be configured to display record information of the identified one or more records in the data interface.

Figure 9A:
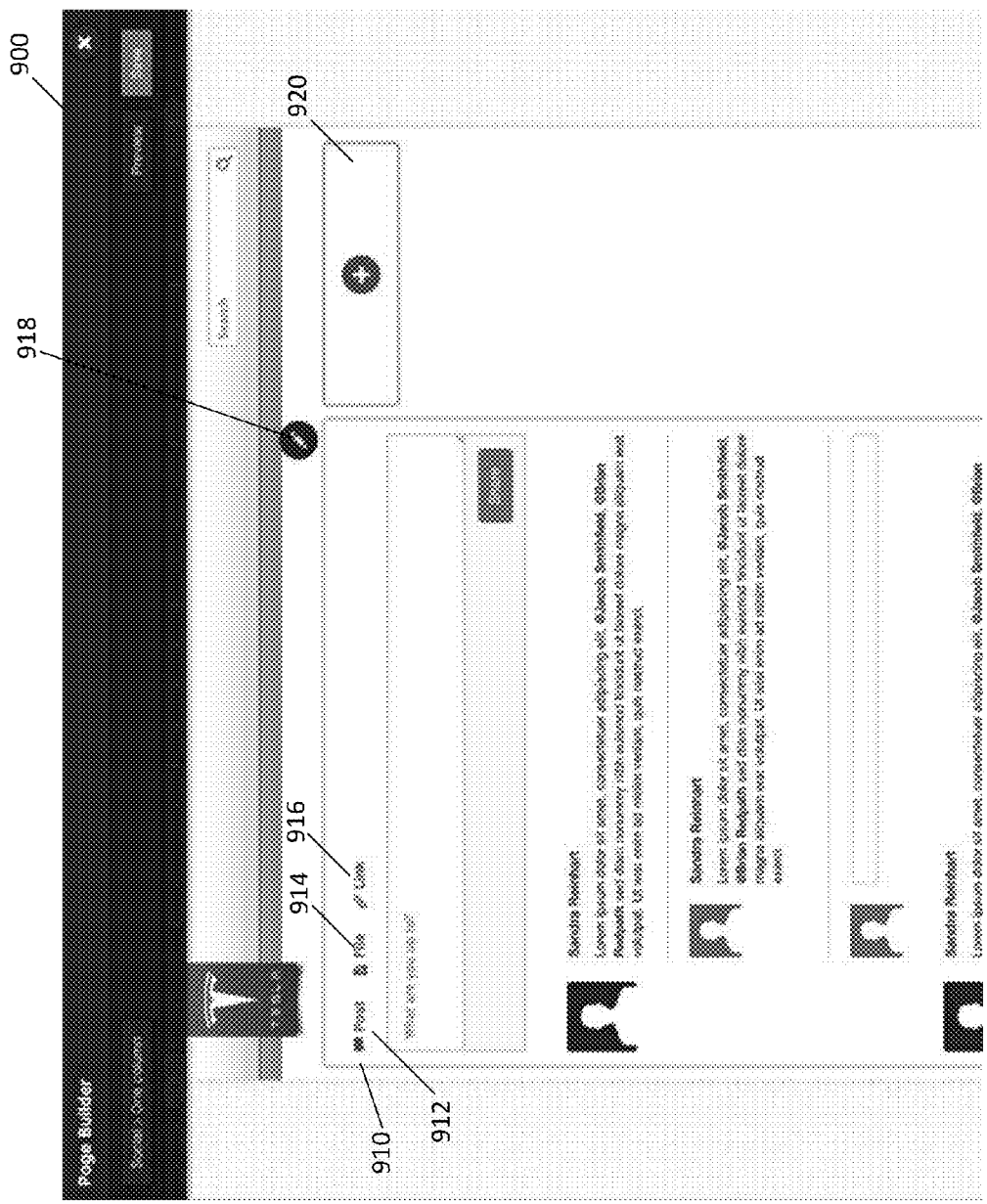
FIGS. 9A-9D show examples of different states of a GUI displaying a configuration interface 900 containing one or more configurable components, in accordance with one or more implementations.

FIG. 9A shows an example of a GUI displaying a configuration interface 900 containing one or more configurable components, in accordance with one or more implementations. In FIG. 9A, the configuration interface 900 includes a feed component 910 and a "add component" button 920. A user may click on the "add component" button to preview, configure, and add a new component to the configuration interface 900.

Figure 9B:
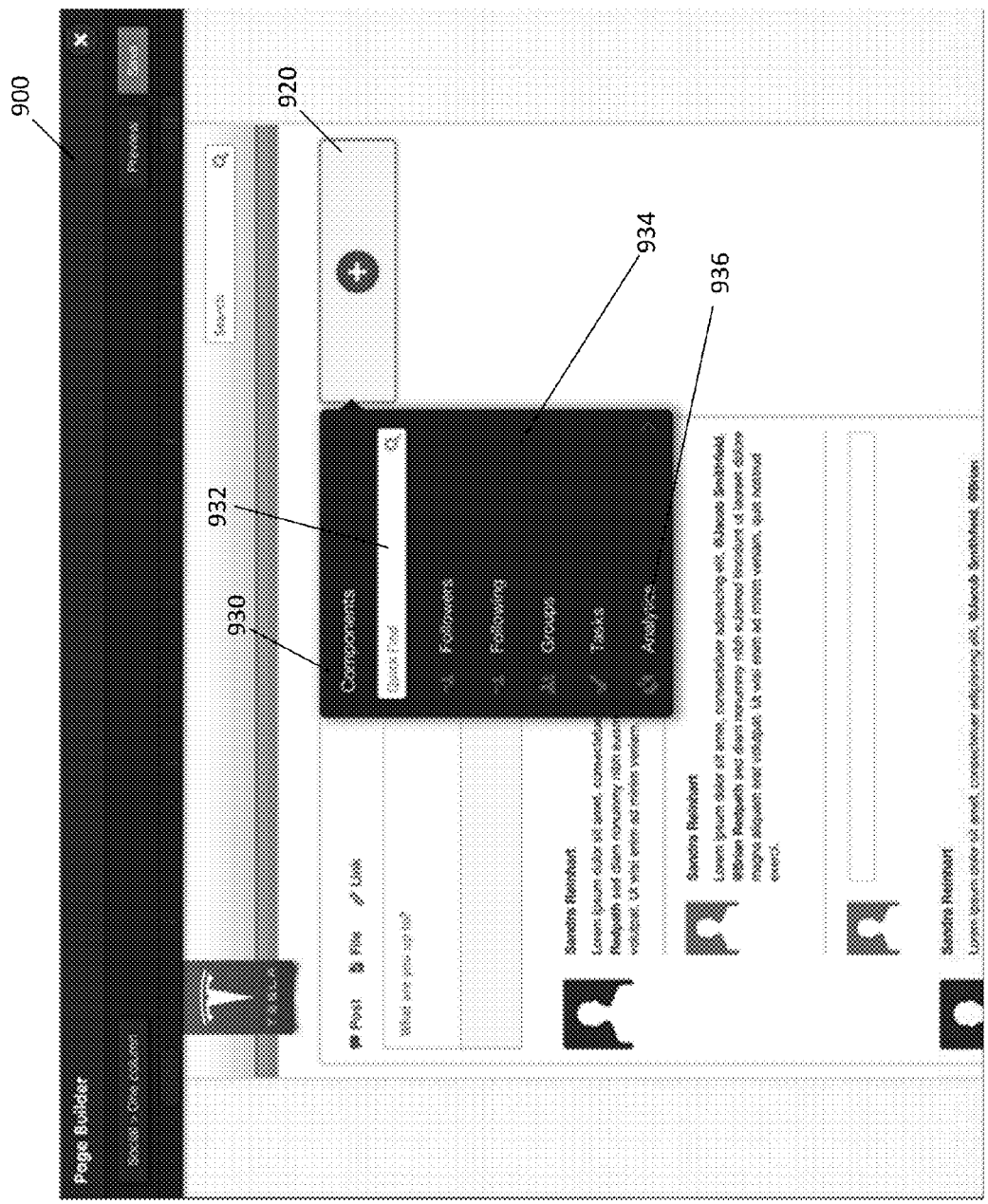

FIG. 9B shows an example of a GUI displaying a configuration interface 900 containing one or more configurable components, in accordance with one or more implementations. When a user clicks on the "add component" button 920, a component menu 930 may be provided for display. The menu 930 may provide one or more components 934 available for inclusion on the data interface, including Followers, Following, Groups, Tasks, and Analytics. Selecting the Analytics component may open a submenu that displays different types of analytics components that may be available for inclusion on the data interface. In some implementations, prebuilt custom components may be listed in the menu for inclusion in the data interface. The custom components may be provided by a third party component developer. The quick find bar 932 allows the user to search for a component to add to the data interface.

Figure 9C:
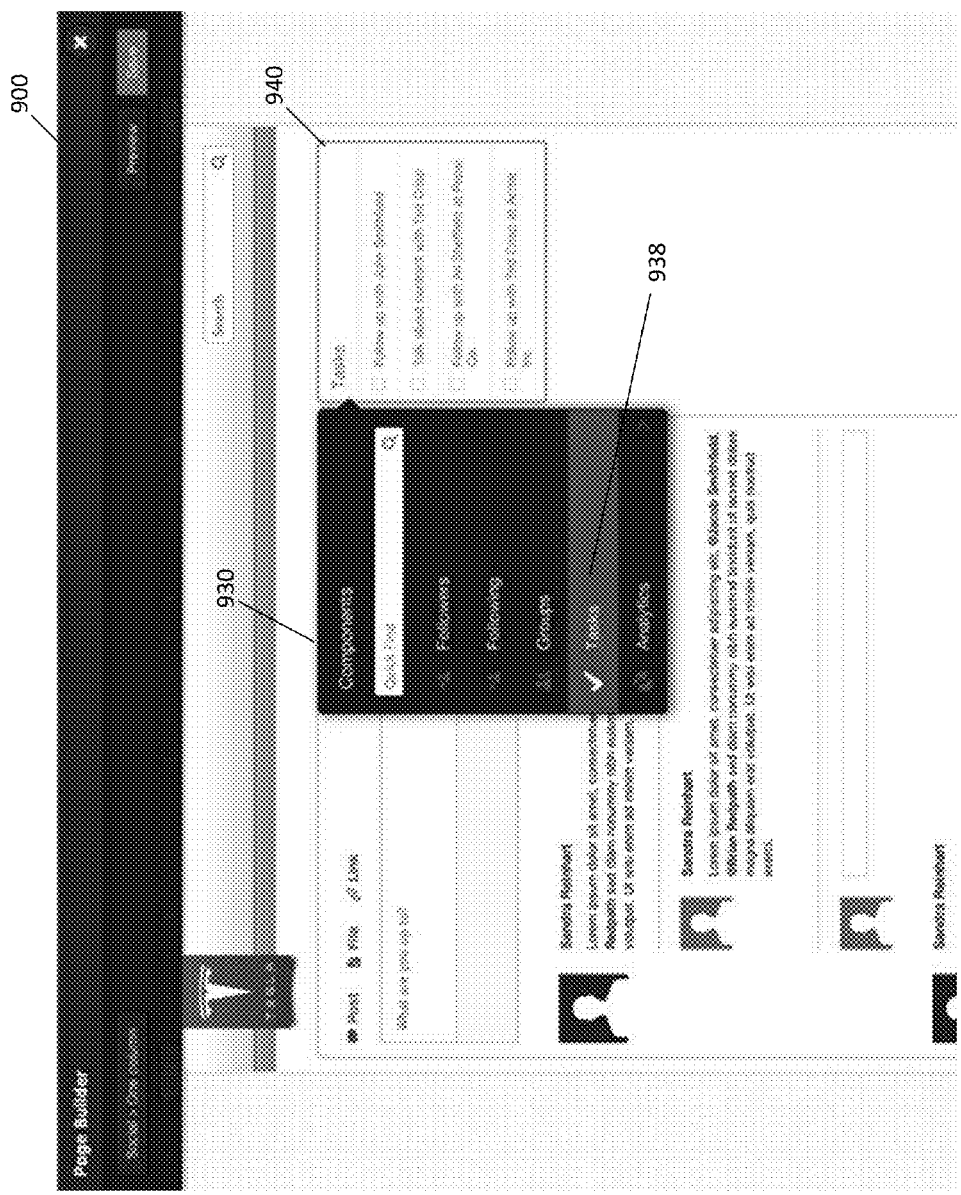

FIG. 9C shows an example of a GUI displaying a configuration interface 900 containing one or more configurable components, in accordance with one or more implementations. In FIG. 9C, the user selects the Tasks type component 938 from the component menu 930, either by hovering over the selection or by clicking on the selection. Upon the user's selection, a preview 940 of the selected component appears in the second column, providing the user a real-time preview of how the selected component will appear in the data interface.

In FIG. 5B, at block 554, the computing device performing method 550B receives a request to configure the feed component. In some implementations, the request may be performed by a user clicking on an edit button of the feed component. The feed component may contain a preview of a social networking feed and one or more publisher actions. The publisher actions may include one or more of: publishing a post, attaching a file, publishing a link, publishing a poll, logging a phone call, creating a record, updating a record, and publishing a note.

In FIG. 5B, at block 556, the computing device performing method 550B, responsive to an instruction to add a publisher action to the feed component, provides for display the requested publisher action in the feed component of the configuration interface. As an example, turning back to FIG. 9A, the feed component 910 includes a publish post action 912, an attach file action 914, and a publish link action 916. A user may click on the edit button 918 to add additional publisher actions to the feed component.

In FIG. 5C, at block 558, the computing device performing method 550C receives a request to configure one or more properties of a first component of the one or more components. In response to the request, the computing device dynamically updates the display of the first component in the configuration interface according to the request. In some implementations, the one or more properties may be one or more of: a title for the component, a display size of the component, one or more data objects of the on-demand service environment to be displayed in the component, one or more attribute fields of the data objects to be displayed in the component, and a maximum or minimum number of items to display in the component. These various properties of the component may be changed by the user to configure how the component appears in the data interface and what information is displayed in the component.

Figure 9D:
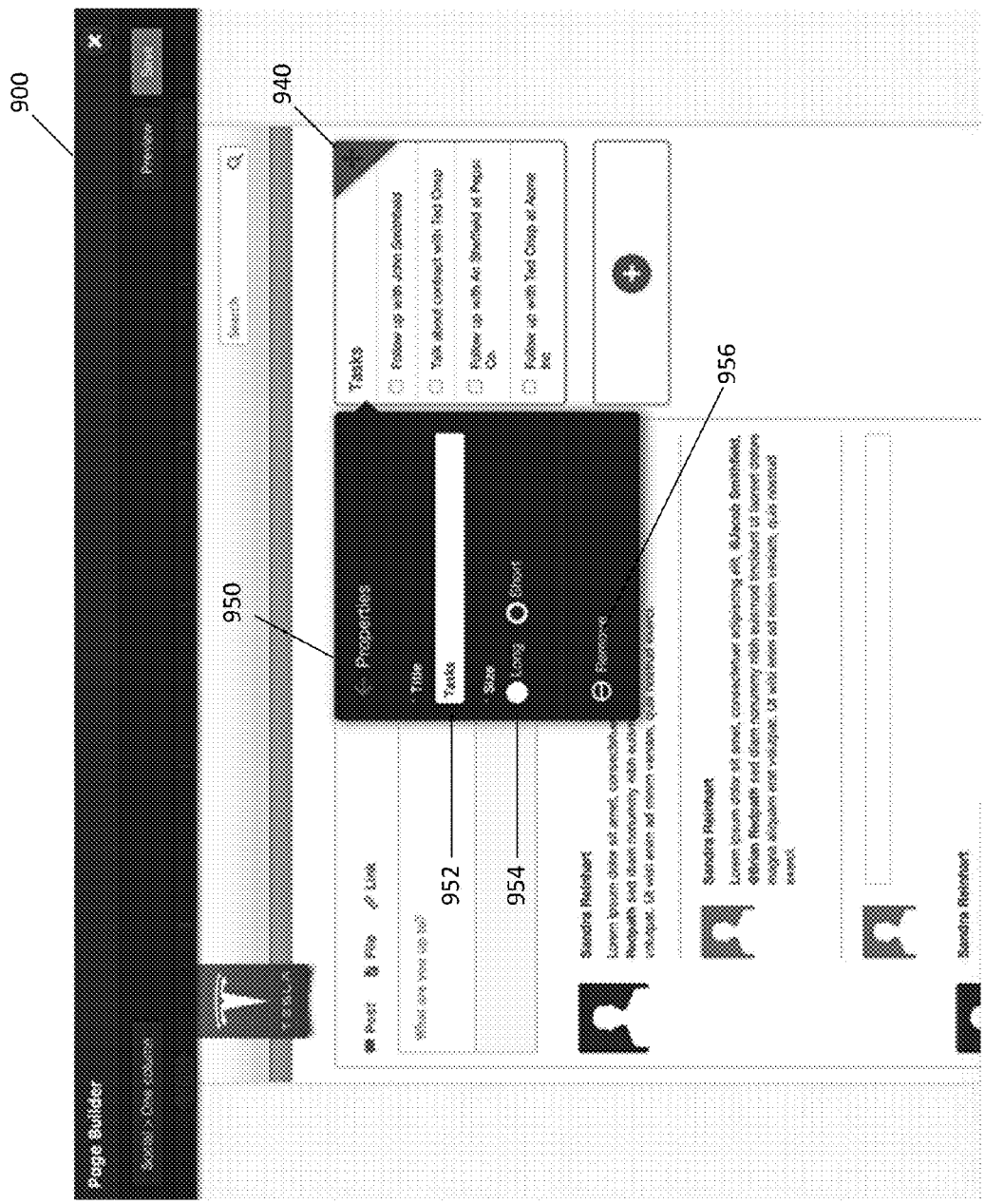

FIG. 9D shows an example of a GUI displaying a configuration interface 900 containing one or more configurable components, in accordance with one or more implementations. In FIG. 9D, the user selects the Tasks component entry from the components menu, causing the Tasks component 940 to be displayed in the second column. Also, in response to the selection, a properties menu 950 is provided for display. The properties menu includes a title property 952, a size property 954, and an option 956 to remove the tasks component from the configuration interface 900. The properties menu allows the user to configure certain properties of the component being added to the configuration interface 900.

Figure 10A:
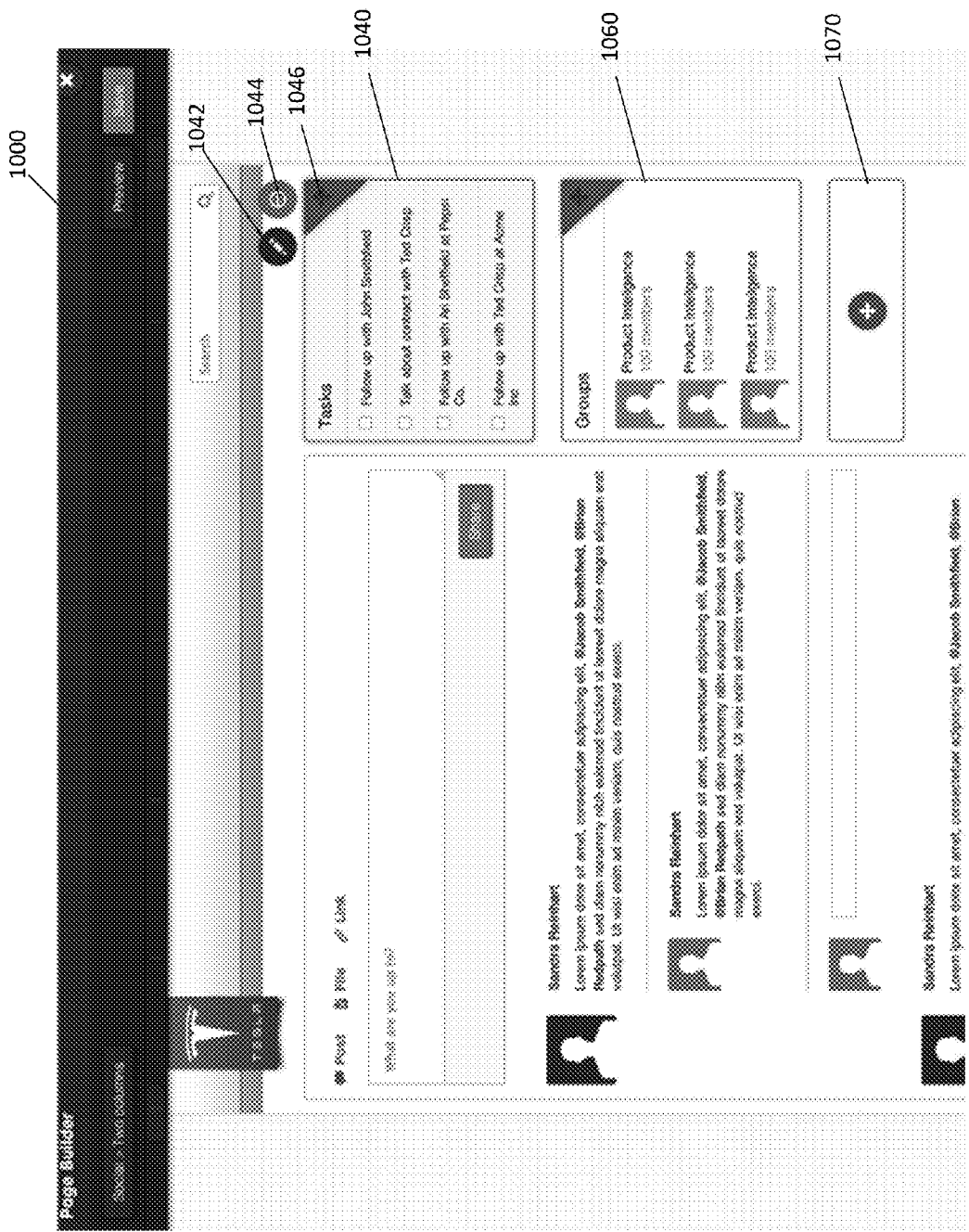
FIGS. 10A-10C show examples of different states of a GUI displaying a configuration interface 1000 containing one or more configurable components, in accordance with one or more implementations.

FIG. 10A shows an example of a GUI displaying a configuration interface 1000 containing one or more configurable components, in accordance with one or more implementations. In FIG. 10A, the Tasks component 1040 has been selected, configured, and added to the configuration interface 1000. The Tasks component 1040 includes an edit button 1042 that allows a user to edit the properties of the Tasks component 1040, such as its title and size. The Tasks component 1040 also includes a delete button 1044, allowing a user to delete the Tasks component 1040 from the configuration interface 1000. Further, the Tasks component 1040 includes a move button 1046, which allows the user to move the Tasks component 1040 to a different position in the configuration interface 1000. Additionally, a Groups component 1060 has also been added to the configuration interface 1000, and another "add component" button 1070 is displayed in the second column to allow a user to continue to add additional components.

Figure 10B:
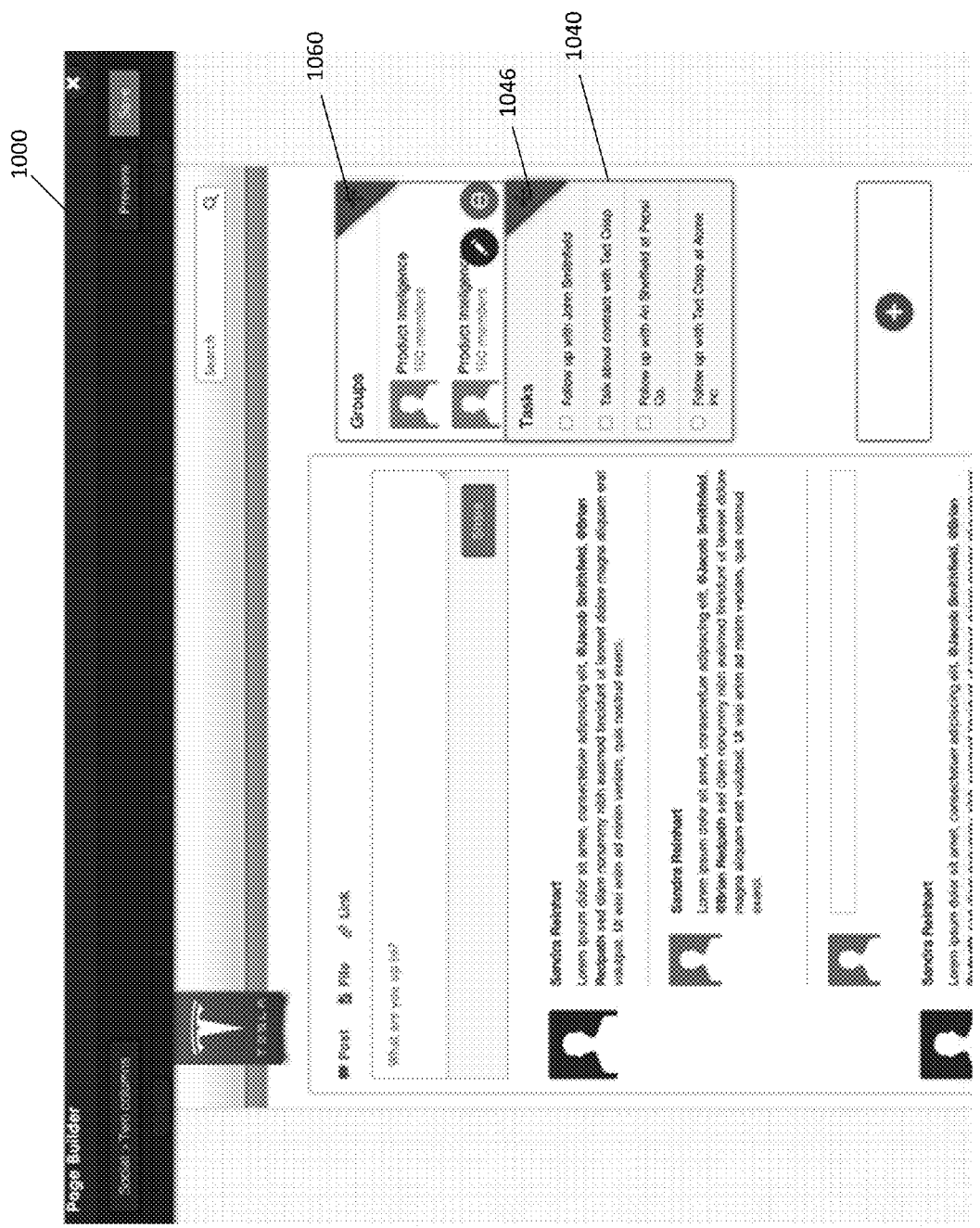

FIG. 10B shows an example of a GUI displaying a configuration interface 1000 containing one or more configurable components, in accordance with one or more implementations. In FIG. 10B, the user has clicked on the move button 1046 of the Tasks component 1040 and is dragging the Tasks component 1040 down the column to position it below the Groups component 1060.

Figure 10C:
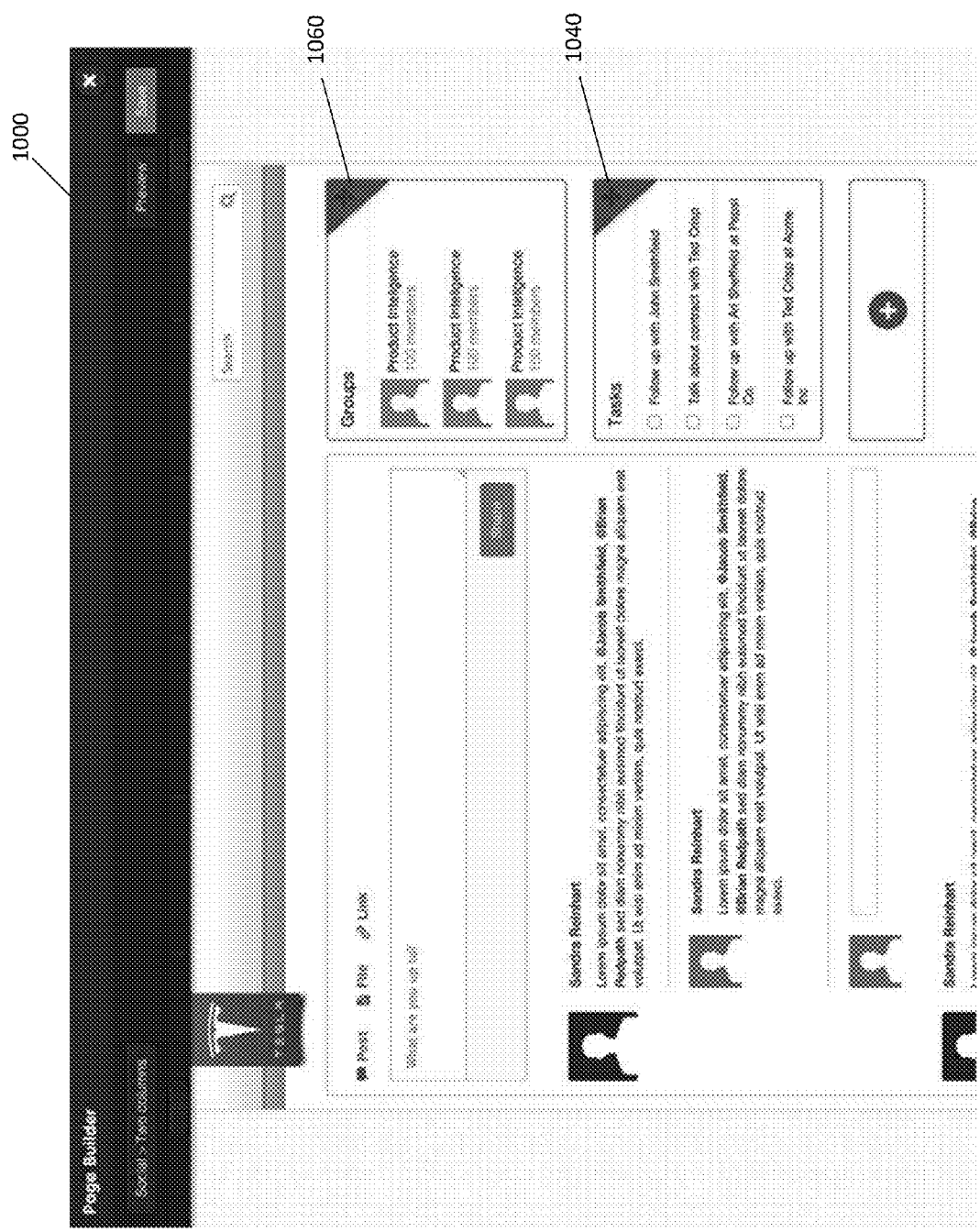

FIG. 10C shows an example of a GUI displaying a configuration interface 1000 containing one or more configurable components, in accordance with one or more implementations. FIG. 10C shows the result of the user moving the Tasks component 1040 below the Groups component 1060 in the configuration interface 1000. In this way, a user may rearrange the components of the configuration interface 1000 and preview how the data interface will appear with different component arrangements.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
one or more processors configured to cause one or more computing devices to:
provide an application for customizing a data interface in an on-demand service environment, the application providing one or more configurable templates, the data interface displayable on a plurality of display devices having different form factors;
receive a selection of a template of the one or more configurable templates; provide for display a configuration interface of the application, the configuration interface displaying one or more components arranged according to the selected template;
receive a request to display an iconic preview of the data interface at a display dimension corresponding to a display device of the plurality of display devices, the display device having a form factor;
determine, based on the requested display dimension, a display configuration for the one or more components on the data interface; and
provide for display in the configuration interface the one or more components according to the determined display configuration, in response to a user input selecting the iconic preview.

2. The system of claim 1, the one or more processors further configurable to cause one or more computing devices to:
responsive to an instruction to create an additional component, the instruction identifying a location in the configuration interface, provide for display the additional component in the configuration interface at the requested location.

3. The system of claim 2, the instruction to create the additional component identifying one or more records stored in a database of an on-demand service environment, the additional component configured to display record information of the identified one or more records.

4. The system of claim 1, wherein the configuration interface comprises a feed component comprising a preview of a social networking feed and one or more publisher actions.

5. The system of claim 4, the one or more processors further configurable to cause one or more computing devices to:
process a request to configure the feed component; and
responsive to an instruction to add a publisher action to the feed component, provide for display the publisher action in the feed component.

6. The system of claim 5, the publisher action being one of: publishing a post, attaching a file, publishing a link, publishing a poll, logging a phone call, creating a record, or updating a record.

7. The system of claim 1, a first display configuration being associated with a first display dimension of the configuration interface, a second display configuration being associated with a second display dimension of the configuration interface, the second display dimension being greater than the first display dimension.

8. The system of claim 7, wherein determining the display configuration for the one or more components of the data interface comprises:
determining that the requested display dimension exceeds the first display dimension and does not exceed the second display dimension; and
displaying the one or more components according to the first display configuration.

9. The system of claim 7, wherein determining the display configuration for the one or more components of the data interface comprises:

determining that the requested display dimension exceeds the first and second display dimensions; and displaying the one or more components according to the second display configuration.

10. The system of claim 1, the one or more processors further configurable to cause one or more computing devices to:

responsive to a request to configure one or more properties of a first component of the one or more components, dynamically update the display of the first component in the configuration interface according to the request to configure the one or more properties.

11. The system of claim 10, the one or more properties being one or more of: a title, a display size, one or more data objects, one or more attribute fields or a number of items to display.

12. The system of claim 1, wherein determining the display configuration and providing for display the one or more components of the configuration interface are performed in near realtime in response to receiving the request to display the preview of the data interface.

13. The system of claim 1, each of the different form factors corresponding to one of:

a desktop display, a laptop display, a tablet display, a smartphone display, a smartwatch display, or other mobile device display.

14. The system of claim 1, the requested display dimension being one of: a display width, a display height, a display depth, or a ratio of display dimensions.

15. The system of claim 1, the determined display configuration indicating one or more of: an order, a size of text and/or an image, a designation of a component to be displayed or hidden, or a number of columns.

16. The system of claim 1, wherein the requested display dimension corresponds to a form factor of a mobile device.

17. A computer implemented method of customizing a data interface in an on-demand service environment, the method comprising:

providing, at a computing device, an application for customizing a data interface in an on-demand service environment, the application providing one or more configurable templates, the data interface displayable on a plurality of display devices having different form factors; receiving a selection of a template of the one or more configurable templates;

providing for display, at a display device of the computing device, a configuration interface of the application, the configuration interface displaying one or more components arranged according to the selected template;

receiving a request to display an iconic preview of the data interface at a display dimension corresponding to a display device of the plurality of display devices, the display device having a form factor;

determining, based on the requested display dimension, a display configuration for the one or more components on the data interface; and providing for display in the configuration interface the one or more components according to the determined display configuration, in response to a user input selecting the iconic preview.

18. The method of claim 17, the method further comprising:

responsive to an instruction to create an additional component, the instruction identifying a location in the configuration interface, causing display of the additional component in the configuration interface at the requested location.

19. A computer program product comprising computer-readable program code to be executed by one or more processors when retrieved from a non-transitory computer-readable medium, the program code comprising instructions to:

provide an application for customizing a data interface in an on-demand service environment, the application providing one or more configurable templates, the data interface displayable on a plurality of display devices having different form factors;

receive a selection of a template of the one or more configurable templates; provide for display a configuration interface of the application, the configuration interface displaying one or more components arranged according to the selected template;

receive a request to display an iconic preview of the data interface at a display dimension corresponding to a display device of the plurality of display devices, the display device having a form factor;

determine, based on the requested display dimension, a display configuration for the one or more components on the data interface; and provide for display in the configuration interface the one or more components according to the determined display configuration, in response to a user input selecting the iconic preview.

20. The computer program product of claim 19, the program code further comprising instructions to:

responsive to an instruction to create an additional component, the instruction identifying a location in the configuration interface, cause display of the additional component in the configuration interface at the requested location.

* * * * *